(12) United States Patent
Yoo et al.

(10) Patent No.: US 10,187,864 B2
(45) Date of Patent: Jan. 22, 2019

(54) TIMING ADVANCE DESIGN FOR ENHANCED COMPONENT CARRIER

(71) Applicant: QUALCOMM Incorporated, San Diego, CA (US)

(72) Inventors: Taesang Yoo, Riverside, CA (US); Juan Montojo, San Diego, CA (US); Jing Sun, San Diego, CA (US); Zhifei Fan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 15/474,883

(22) Filed: Mar. 30, 2017

(65) Prior Publication Data

US 2017/0289938 A1 Oct. 5, 2017

Related U.S. Application Data

(60) Provisional application No. 62/316,944, filed on Apr. 1, 2016.

(51) Int. Cl.
*H04W 4/00* (2018.01)
*H04W 56/00* (2009.01)
(Continued)

(52) U.S. Cl.
CPC ........... *H04W 56/007* (2013.01); *H04L 5/001* (2013.01); *H04L 5/1469* (2013.01);
(Continued)

(58) Field of Classification Search
None
See application file for complete search history.

(56) References Cited

U.S. PATENT DOCUMENTS 9,054,835 B2 6/2015 Kwon et al.
9,402,255 B2 7/2016 Lohr et al.
(Continued)

FOREIGN PATENT DOCUMENTS

WO WO-2015108007 A1 7/2015

OTHER PUBLICATIONS

ISA/EP, International Search Report and Written Opinion of the International Searching Authority, Int'l Application No. PCT/US2017/025343, dated Jul. 3, 2017, European Patent Office, Rijswijk, NL, 14 pgs.

(Continued)

*Primary Examiner* — Bob A Phunkulh
(74) *Attorney, Agent, or Firm* — Holland & Hart LLP

(57) ABSTRACT

Methods, systems, and devices for wireless communication are described. A base station may establish a transmission gap between downlink (DL) and uplink (UL) transmissions on a shared radio frequency (RF) spectrum band using time division duplex (TDD). A length of the gap may be based at least in part on a maximum allowed length of a filler signal corresponding to a coverage area of the base station. To reserve the shared band, a user equipment (UE) may communicate the filler signal for a length of time that is based at least in part on the maximum allowed length and a geographic distance between the UE and the base station. UEs farther from the base station transmit the filler signal of shorter lengths before sending an UL transmission, so that the UL transmissions from different UEs arrive at the same time at the base station regardless of the geographic distance between the UEs.

30 Claims, 17 Drawing Sheets

(51) Int. Cl.
H04L 5/00 (2006.01)
H04L 5/14 (2006.01)
H04W 72/04 (2009.01)
H04W 72/12 (2009.01)
H04W 74/00 (2009.01)

(52) U.S. Cl.
CPC ...... H04W 56/0005 (2013.01); H04W 72/044 (2013.01); H04W 72/12 (2013.01); H04W 74/002 (2013.01)

(56) References Cited

U.S. PATENT DOCUMENTS

| | | | | |
|---|---|---|---|---|
| 2009/0067448 | A1* | 3/2009 | Stanwood | H04L 12/413 370/447 |
| 2010/0208640 | A1* | 8/2010 | Cheng | H04W 36/385 370/311 |
| 2014/0133369 | A1* | 5/2014 | Cheng | H04L 5/16 370/280 |
| 2014/0307645 | A1* | 10/2014 | Ji | H04L 1/0003 370/329 |
| 2015/0043396 | A1* | 2/2015 | Ekpenyong | H04L 5/1469 370/280 |
| 2015/0358998 | A1* | 12/2015 | Golitschek Edler Von Elbwart | H04W 48/16 370/280 |
| 2015/0381422 | A1* | 12/2015 | Eriksson | H04B 7/2656 370/277 |
| 2016/0057770 | A1 | 2/2016 | Yerramalli et al. | |
| 2016/0219547 | A1 | 7/2016 | Seo et al. | |
| 2016/0344526 | A1 | 11/2016 | Fan et al. | |
| 2016/0345316 | A1 | 11/2016 | Kazmi et al. | |

OTHER PUBLICATIONS

Samsung, "Discussion on UL Transmission for LAA," 3GPP TSG RAN WG1 Meeting #81, R1-152872, Fukuoka, Japan, May 25-29, 2015, 5 pgs., XP050973756, 3rd Generation Partnership Project.
ZTE, "UL Framework for LAA," 3GPP TSG RAN WG1 Meeting #83, R2-156994, Anaheim, USA, Nov. 15-22, 2015, 6 pgs., XP051003305, 3rd Generation Partnership Project.

* cited by examiner

TIMING ADVANCE DESIGN FOR ENHANCED COMPONENT CARRIER

CROSS REFERENCES

The present Application for Patent claims priority to U.S. Provisional Patent Application No. 62/316,944 by Yoo, et al., entitled "Timing Advance Design For Enhanced Component Carrier," filed Apr. 1, 2016, assigned to the assignee hereof.

BACKGROUND

The following relates generally to wireless communication, and more specifically to timing advance design.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE).

In conventional systems, a base station may communicate with UEs in shared or unlicensed radio frequency spectrum band. When communicating in an unlicensed spectrum, there may be a gap between downlink (DL) and uplink (UL) transmissions during which UEs may attempt to reserve the shared spectrum. In some cases, UEs may initiate UL transmissions at different times to account for propagation delay based on geographic distance to a base station.

UL transmissions that are not synchronized in time may increase computational complexity at a base station. Unaligned UL transmissions may also result in interference between UEs. This may result in additional system costs or reduced system throughput.

SUMMARY

A base station may establish a transmission gap between downlink (DL) and uplink (UL) transmissions on a shared radio frequency (RF) spectrum band using time division duplexing (TDD). A length of the gap may be based at least in part on a maximum allowed length of a filler signal corresponding to a coverage area of the base station. To reserve the shared band, a user equipment (UE) may communicate the filler signal for a length of time that is based at least in part on the maximum allowed length and a geographic distance between the UE and the base station. UEs farther from the base station transmit a filler signal of shorter lengths before sending an UL transmission, so that the UL transmissions from different UEs arrive at the same time at the base station regardless of the geographic distance between the UEs. Generally, the described techniques provide for timing advance designs, which may be used for types of wireless transmissions, such as for example using enhanced component carriers (eCCs), Licensed Assisted Access (LAA) component carriers (CCs), New Radio (NR) systems (e.g., 5G), MuLTEFire networks, etc.

A method of wireless communication is described. The method may include identifying a length of a filler signal based at least in part on a maximum allowed length of the filler signal configured by a base station, transmitting the filler signal of the identified length to reserve access to a shared RF spectrum band, the filler signal transmitted during a transmission gap that occurs between a DL transmission and an UL transmission in TDD and transmitting the UL transmission on the reserved shared RF spectrum band subsequent to the transmission of the filler signal.

An apparatus for wireless communication is described. The apparatus may include means for identifying a length of a filler signal based at least in part on a maximum allowed length of the filler signal configured by a base station, means for transmitting the filler signal of the identified length to reserve access to a shared RF spectrum band, the filler signal transmitted during a transmission gap that occurs between a DL transmission and an UL transmission in TDD and means for transmitting the UL transmission on the reserved shared RF spectrum band subsequent to the transmission of the filler signal.

A further apparatus is described. The apparatus may include a processor, memory in electronic communication with the processor, and instructions stored in the memory. The instructions may be operable to cause the processor to identify a length of a filler signal based at least in part on a maximum allowed length of the filler signal configured by a base station, transmit the filler signal of the identified length to reserve access to a shared RF spectrum band, the filler signal transmitted during a transmission gap that occurs between a DL transmission and an UL transmission in TDD and transmit the UL transmission on the reserved shared RF spectrum band subsequent to the transmission of the filler signal.

A non-transitory computer readable medium for wireless communication is described. The non-transitory computer-readable medium may include instructions to cause a processor to identify a length of a filler signal based at least in part on a maximum allowed length of the filler signal configured by a base station, transmit the filler signal of the identified length to reserve access to a shared RF spectrum band, the filler signal transmitted during a transmission gap that occurs between a DL transmission and an UL transmission in TDD and transmit the UL transmission on the reserved shared RF spectrum band subsequent to the transmission of the filler signal.

In some examples of the method, apparatus, or non-transitory computer-readable medium described above, the maximum allowed length of the filler signal corresponds to a length of a maximum round trip signal delay between the base station and an edge of a coverage area of the base station. Some examples of the method, apparatus, or non-transitory computer-readable medium described above may further include processes, features, means, or instructions for deriving the maximum allowed length of the filler signal from a parameter configured by the base station.

In some examples of the method, apparatus, or non-transitory computer-readable medium described above, the identified length of the filler signal is based at least in part on a timing advance value, the timing advance value based at least in part on a propagation delay between a UE and the base station. In some examples of the method, apparatus, or non-transitory computer-readable medium described above, the identified length of the filler signal is based at least in part on a difference between the maximum allowed length of the filler signal and the timing advance value.

In some examples of the method, apparatus, or non-transitory computer-readable medium described above, a length of the transmission gap is a based at least in part on a length of a guard period, the timing advance value, and the maximum allowed length of the filler signal. In some examples of the method, apparatus, or non-transitory computer-readable medium described above, the length of the transmission gap varies over time due to changes to the identified length of the filler signal based at least in part on updates to the timing advance value.

In some examples of the method, apparatus, or non-transitory computer-readable medium described above, the filler signal is composed of a fixed length portion and a variable length portion. In some examples of the method, apparatus, or non-transitory computer-readable medium described above, the fixed length portion has a minimum specified length for the filler signal and the variable length portion has a length determined based at least in part on an update to the timing advance value.

In some examples of the method, apparatus, or non-transitory computer-readable medium described above, the maximum allowed length of the filler signal and the guard period length are constants. Some examples of the method, apparatus, or non-transitory computer-readable medium described above may further include processes, features, means, or instructions for identifying an end of the DL transmission and a beginning of the guard period length.

Some examples of the method, apparatus, or non-transitory computer-readable medium described above may further include processes, features, means, or instructions for determining that the guard period length has expired prior to transmitting the filler signal.

Some examples of the method, apparatus, or non-transitory computer-readable medium described above may further include processes, features, means, or instructions for identifying an updated timing advance value. Some examples of the method, apparatus, or non-transitory computer-readable medium described above may further include processes, features, means, or instructions for identifying an updated length of the filler signal based at least in part on the maximum allowed length of the filler signal and the updated timing advance value. Some examples of the method, apparatus, or non-transitory computer-readable medium described above may further include processes, features, means, or instructions for transmitting a subsequent filler signal of the updated length during a subsequent transmission gap occurring between a subsequent DL transmission and a subsequent UL transmission. Some examples of the method, apparatus, or non-transitory computer-readable medium described above may further include processes, features, means, or instructions for transmitting the subsequent UL transmission subsequent to the transmission of the subsequent filler signal.

A method of wireless communication is described. The method may include determining, by a base station, a maximum allowed length of a filler signal for a coverage area of the base station, the base station configured to communicate with a plurality of UEs within the coverage area on a shared RF spectrum band using TDD and transmitting, to at least one of the UEs, the maximum allowed length of the filler signal and authorization to attempt to reserve the shared RF spectrum band by transmitting the filler signal during a transmission gap subsequent to an end of a DL transmission.

An apparatus for wireless communication is described. The apparatus may include means for determining, by a base station, a maximum allowed length of a filler signal for a coverage area of the base station, the base station configured to communicate with a plurality of UEs within the coverage area on a shared RF spectrum band using TDD and means for transmitting, to at least one of the UEs, the maximum allowed length of the filler signal and authorization to attempt to reserve the shared RF spectrum band by transmitting the filler signal during a transmission gap subsequent to an end of a DL transmission.

A further apparatus is described. The apparatus may include a processor, memory in electronic communication with the processor, and instructions stored in the memory. The instructions may be operable to cause the processor to determine, by a base station, a maximum allowed length of a filler signal for a coverage area of the base station, the base station configured to communicate with a plurality of UEs within the coverage area on a shared RF spectrum band using TDD and transmit, to at least one of the UEs, the maximum allowed length of the filler signal and authorization to attempt to reserve the shared RF spectrum band by transmitting the filler signal during a transmission gap subsequent to an end of a DL transmission.

A non-transitory computer readable medium for wireless communication is described. The non-transitory computer-readable medium may include instructions to cause a processor to determine, by a base station, a maximum allowed length of a filler signal for a coverage area of the base station, the base station configured to communicate with a set of UEs within the coverage area on a shared RF spectrum band using TDD and transmit, to at least one of the UEs, the maximum allowed length of the filler signal and authorization to attempt to reserve the shared RF spectrum band by transmitting the filler signal during a transmission gap subsequent to an end of a DL transmission.

In some examples of the method, apparatus, or non-transitory computer-readable medium described above, the maximum allowed length of the filler signal corresponds to a length of a maximum round trip signal delay between an edge of the coverage area and the base station. In some examples of the method, apparatus, or non-transitory computer-readable medium described above, the transmitting of the maximum allowed length of the filler signal occurs prior to the DL transmission via broadcast signaling or higher layer signaling.

In some examples of the method, apparatus, or non-transitory computer-readable medium described above, the transmitting of the maximum allowed length of the filler signal is part of the DL transmission. Some examples of the method, apparatus, or non-transitory computer-readable medium described above may further include processes, features, means, or instructions for identifying a timing advance value for the at least one UE based at least in part on propagation delay between the base station and the at least one UE.

Some examples of the method, apparatus, or non-transitory computer-readable medium described above may further include processes, features, means, or instructions for identifying a length of the filler signal for the at least one UE based at least in part on the maximum allowed length of the filler signal and the timing advance value. In some examples of the method, apparatus, or non-transitory computer-readable medium described above, the authorization authorizes the at least one UE to attempt to reserve the shared RF spectrum band by transmitting the filler signal of the identified length.

In some examples of the method, apparatus, or non-transitory computer-readable medium described above, the authorization identifies at least one of a length of the transmission gap, the identified length of the filler signal, a length of a guard period, or a combination thereof. In some examples of the method, apparatus, or non-transitory computer-readable medium described above, the transmission gap is based at least in part on a guard period length and the maximum allowed length of the filler signal.

Some examples of the method, apparatus, or non-transitory computer-readable medium described above may further include processes, features, means, or instructions for beginning, after an end of the DL transmission, to process the shared RF spectrum searching for an UL transmission from the at least one UE after a length corresponding to a sum of a guard period length and a length specified by the maximum allowed length of the filler signal.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

DETAILED DESCRIPTION

Figure 1:
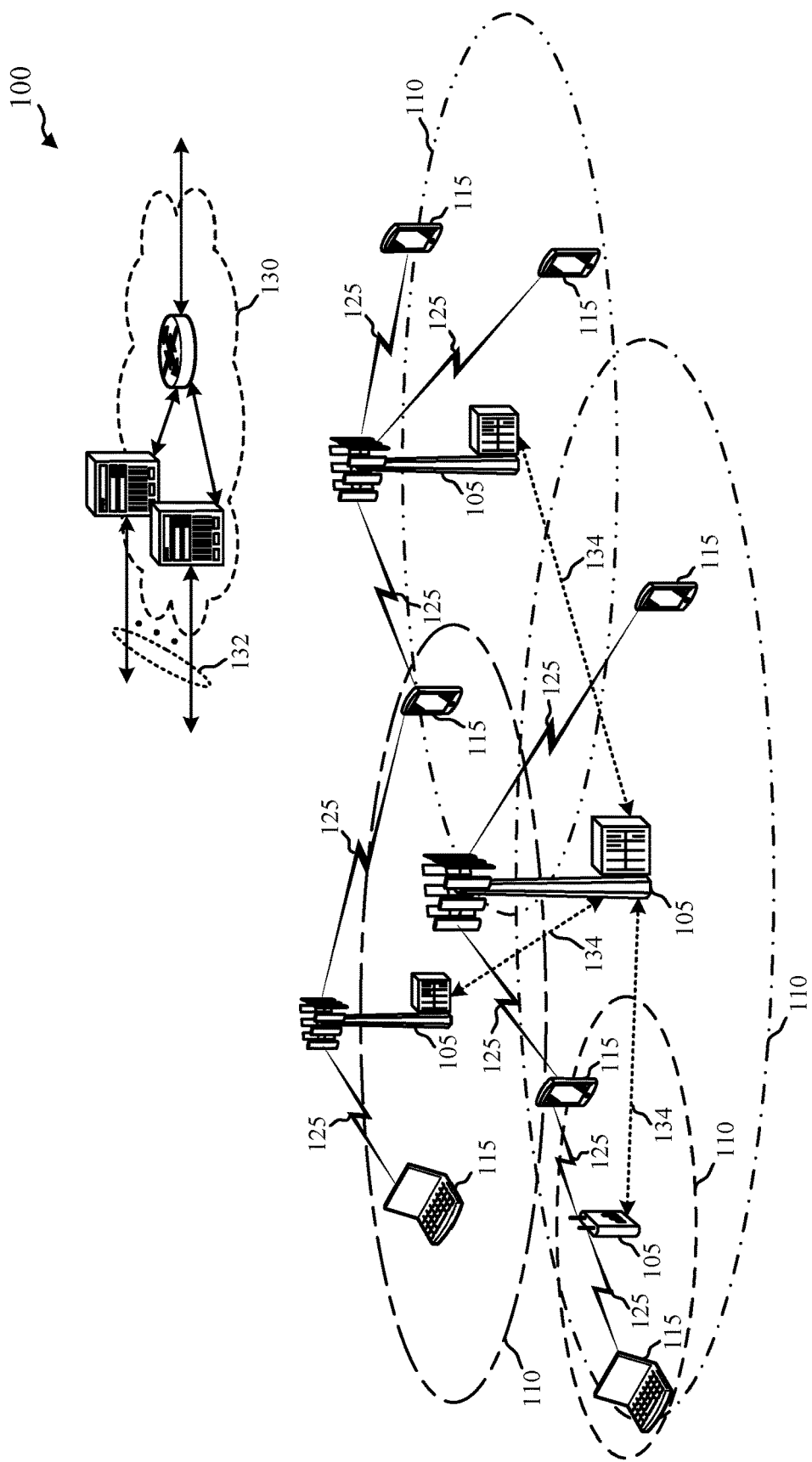
FIG. 1 illustrates an example of a wireless communications system that supports timing advance design in accordance with one or more aspects of the present disclosure.

The example embodiments describe the timing of communications between a base station and one or more user equipments (UEs) in an unlicensed shared radio frequency spectrum band. In, for example, enhanced component carrier (eCC), transmission bursts may take the form of downlink (DL) only, uplink (UL) only, or DL+UL. Transmissions of the base station and the UE may be time division duplex (TDD) and sent in predetermined time slots. The base station may communicate to the UEs in DL time slots, and may receive UL bursts from the UEs in UL time slots. In some examples, only one UE may communicate in a particular UL time slot at a time. In other examples, multiple UEs may communicate in the same UL time slot using, for example, a different frequency or code.

Timing issues may arise when a base station and one or more UEs are not synchronized. For example, the base station may receive an uplink burst from one or more UEs at a different time slot than expected. Receiving an UL burst at a different time than expected may interfere with other DL or UL bursts, and may cause data reception errors. To overcome timing issues, a base station may provide a transmission gap between the end of a DL transmission and before the beginning of an UL transmission. During the transmission gap, UEs may reserve UL time slots for sending one or more UL bursts subsequent to expiration of the transmission gap. The temporal duration of the transmission gap may be a function of a maximum allowed length of a filler signal configured by a base station. The base station may signal or otherwise inform the UEs of the maximum allowed length of a filler signal.

When desiring to reserve a transmission medium, a UE may communicate a filler signal during the transmission gap to reserve one or more uplink time slots. The length of time the UE communicates the filler signal may be based at least in part on the maximum allowed length of a filler signal reduced by a timing advance value. The length of the filler signal may be inversely related to the geographic distance a UE is relative to the base station. As a result, the length of a filler signal sent by a closer UE may be longer than the length of a filler signal sent by a farther UE (e.g., a UE farther away from a base station compared to the closer UE). A UE may calculate how long of a filler signal it is to send, or the base station may perform this calculation and inform the UE of its filler signal length.

Aspects of the disclosure are initially described in the context of a wireless communication system. The examples provide timing diagrams for illustrating timing of downlink-only transmission bursts, uplink-only transmission bursts, and an uplink-only transmission burst following a downlink transmission burst that supports timing advance design for various implementations such as eCC, LAACCs, new radio (NR) systems (e.g., 5G), MuLTEFire networks, etc. in accordance with aspects of the present disclosure. Aspects of the disclosure are further illustrated by and described with reference to apparatus diagrams, system diagrams, and flowcharts that relate to timing advance design for such implementations.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network, or a NR network. For example, wireless communications system 100 may include an LTE/LTE-A network, a MuLTEFire network, a neutral host small cell network, or the like, operating with overlapping coverage areas. A MuLTEFire network may include access points (APs) and/or base stations 105 communicating in an unlicensed radio frequency spectrum band, e.g., without a licensed frequency anchor carrier. For example, the MuLTEFire network may operate without an anchor carrier in the licensed spectrum. In some cases, wireless communications system 100 may support enhanced broadband communications, ultra-reliable (i.e., mission critical) communications, low latency communications, and communications with low-cost and low-complexity devices. In some examples, a MuLTEfire communications system may support UE with coverage enhancement mode. Additionally, a MuLTEfire communications system may include and support different UE types. One UE type may be a legacy UE that may be deficient of capabilities related to a coverage enhancement mode. Additionally or alternatively, another UE type may be a MuLTEfire UE that may possess capabilities related to coverage enhancement mode. In some examples, the wireless communications system 100 may be an eCC based network, which may be an example of an unlicensed, wideband carrier network having distinct OFDM numerology and other features. The example wireless communications system 100 may implement a transmission gap to enable UEs 115 within a coverage area of the base station 105 to share access to a radio frequency spectrum band. A length of the transmission gap may be based at least in part on a maximum allowed length of a filler signal used to reserve the shared spectrum band, and may enable the wireless communications system 100 to maintain synchronization accounting for different geographic distances between the UEs 115 and the base station 105.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Carriers may transmit bidirectional communications using frequency division duplex (FDD) (e.g., using paired spectrum resources) or TDD operation (e.g., using unpaired spectrum resources). For TDD frame structures, each subframe may carry UL or DL traffic. Use of TDD offers flexible deployments without requiring paired UL-DL spectrum resources. In some TDD network deployments, interference may be caused between UL and DL communications (e.g., interference between UL and DL communication from different base stations, interference between UL and DL communications from base stations and UEs, etc.). For example, where different base stations 105 serve different UEs 115 within overlapping coverage areas according to different TDD UL-DL configurations, a UE 115 attempting to receive and decode a DL transmission from a serving base station 105 can experience interference from UL transmissions from other, proximately located UEs 115.

In some cases, wireless communications system 100 may utilize one or more eCCs. An eCC may be characterized by one or more features including: flexible bandwidth, different transmission time intervals (TTIs), and modified control channel configuration. In some cases, an eCC may be associated with a carrier aggregation (CA) configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum).

Wireless communications system 100 may operate in an ultra-high frequency (UHF) frequency region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station) and a receiver (e.g. a UE), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

Time intervals in LTE or NR may be expressed in multiples of a basic time unit (which may be a sampling period of Ts=1/30,720,000 seconds). Time resources may be organized according to radio frames of length of 10 ms (Tf=307200 Ts), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a CC, a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communications system 100 (e.g., a LTE system, or a NR system (e.g., 5G)) may utilize eCCs to, for example, improve throughput, latency, or reliability of wireless communications. An eCC may be characterized by one or more features including: wide tone spacing, short subframe duration, operation in a contention-based radio frequency spectrum band (or in a contention-free radio frequency spectrum band), shorter symbol duration, shorter TTIs (e.g., slots), modified control channel configuration, and wider bandwidth. An eCC may have a relatively wide bandwidth (e.g., 80 MHz or 100 MHz) as compared to a non-eCC (e.g., an LTE/LTE-A CC, LAA CC, or Stand Alone CC in a contention-based radio frequency spectrum band), which may have a relatively smaller bandwidth (e.g., 20 MHz). An eCC may include one or more channels (e.g., segments of bandwidth, such as four 20 MHz segments of bandwidth). eCC characterized by wide bandwidth may include one or more segments that may be utilized by UEs 115 that are not capable of monitoring the whole bandwidth or prefer to use a limited bandwidth (e.g., to conserve power). In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other component carriers (CCs), which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 Mhz, etc.) at reduced symbol durations (e.g., 16.67 μs). A TTI in eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 Mhz, etc.) at reduced symbol durations (e.g., 16.67 μs). A TTI in eCC may consist of one or multiple symbols. In some cases, the TTI duration (that is, the number of symbols in a TTI) may be variable.

Figure 2:
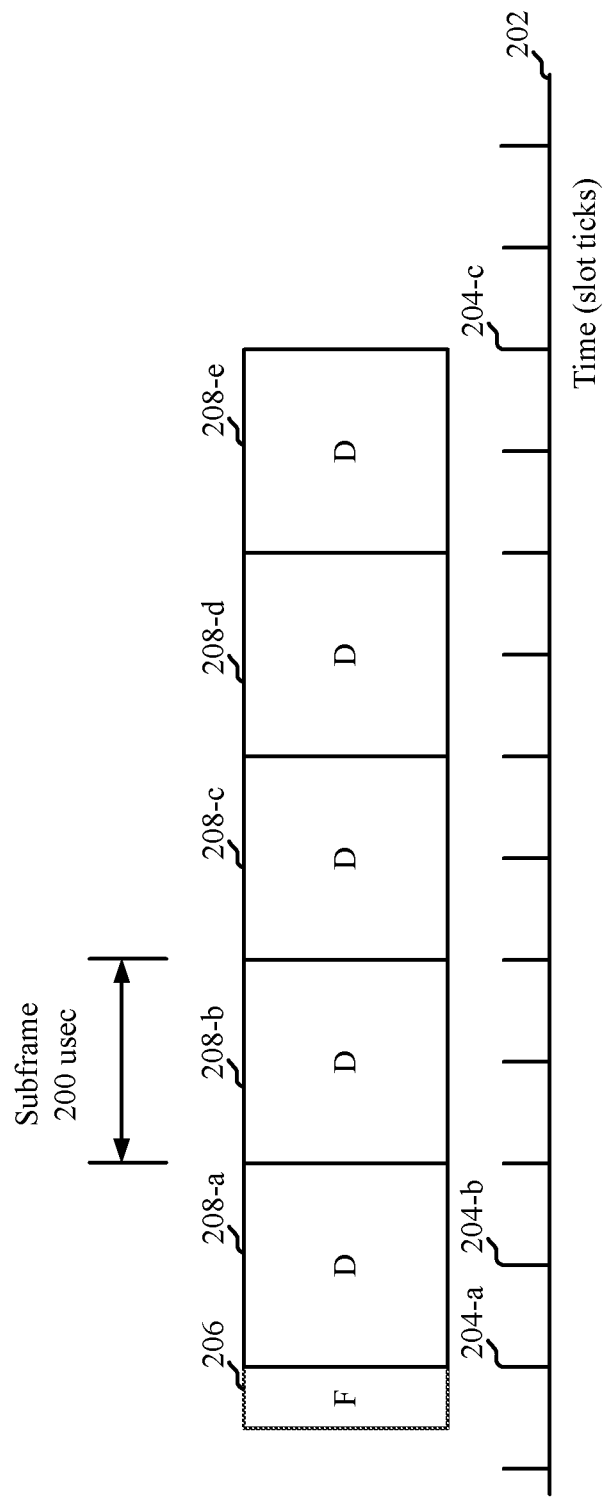
FIG. 2 illustrates an example of a timing diagram for a downlink-only transmission burst that supports timing advance design in accordance with one or more aspects of the present disclosure.
Figure 3:
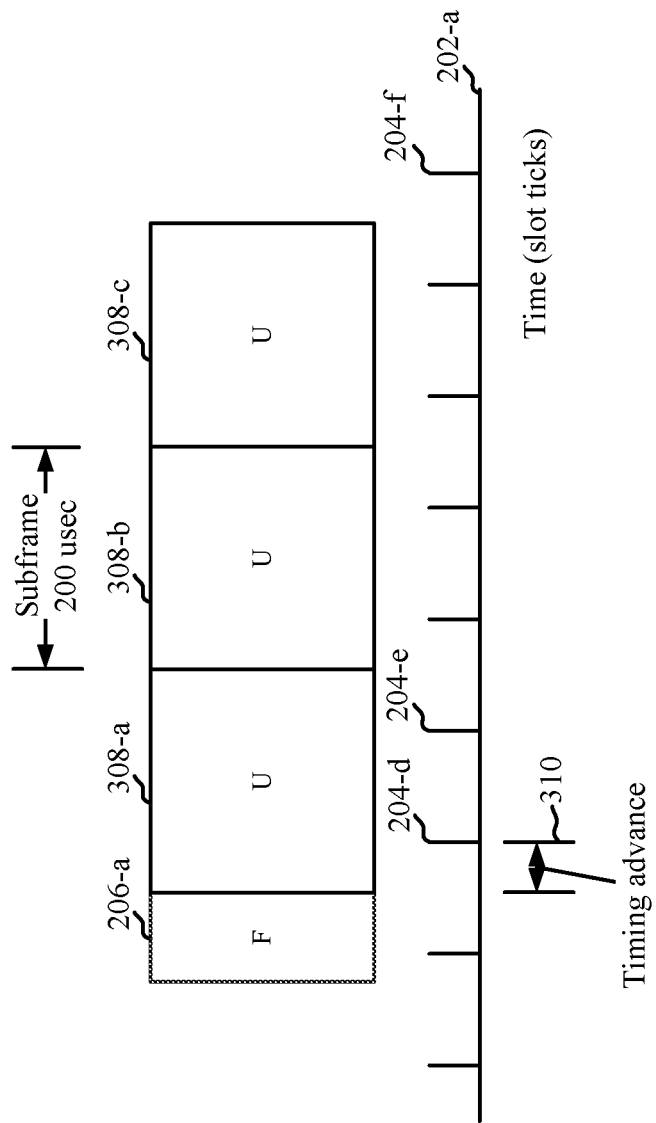
FIG. 3 illustrates an example of a timing diagram for an uplink-only transmission burst that supports timing advance design in accordance with one or more aspects of the present disclosure.
Figure 4:
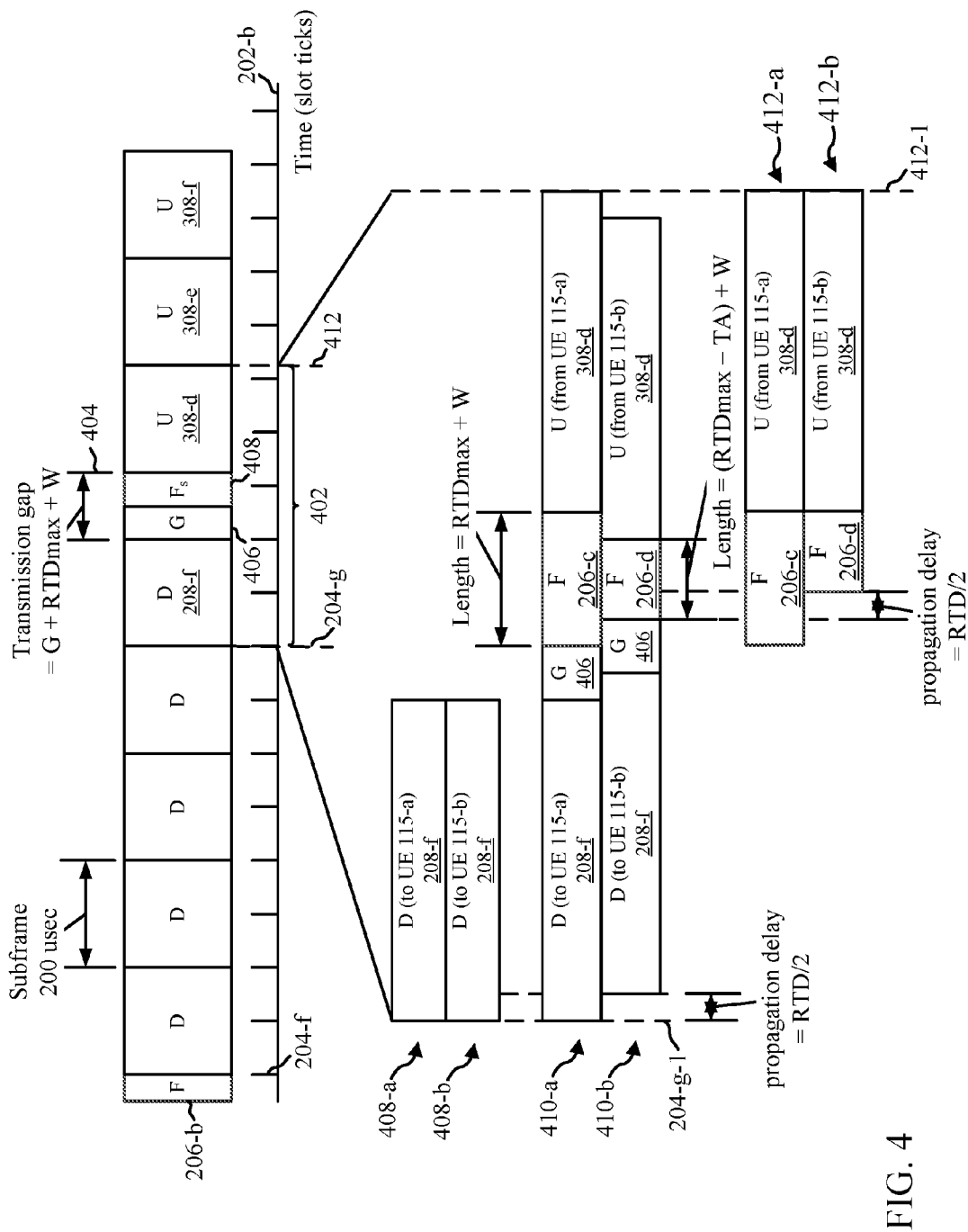
FIG. 4 illustrates an example of a timing diagram for a downlink transmission burst following an uplink transmission burst that supports timing advance design in accordance with one or more aspects of the present disclosure.

In eCC, transmission bursts may take the form of DL only, UL only, or DL+UL. FIG. 2 depicts an example timeline of a DL-only transmission burst, FIG. 3 depicts an example timeline of an UL-only transmission burst, and FIG. 4 depicts an example timeline of a DL transmission burst followed by an UL transmission burst.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. In some examples, wireless communications system 100 may employ MuLTE-fire communications operating in a stand-alone manner using shared radio frequency spectrum. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, or TDD, or a combination of both.

FIG. 2 illustrates a timeline from a base station's point of view of a DL-only transmission burst to one or more UEs. The base station may be a base station 105 as described in FIG. 1 and may communicate with one or more UEs 115 as also described in FIG. 1. The base station 105 may provide a clock with which all UEs 115 are synchronized. As depicted, the base station 105 may establish time slots within which the base station 105 or a UE 115 may communicate. A time slot is represented in FIG. 2 as the duration of time occurring between two slot ticks 204 along timeline 202, and each time slot may have the same duration. As depicted, one time slot occurs between slot ticks 204-a and 204-b.

Because the transmission medium is shared, the base station 105 and/or a UE 115 may communicate a filler (F) signal 206 to reserve one or more timeslots on the transmission medium prior to transmitting a transmission burst. One purpose of the filler signal 206 is to hold (e.g., reserve) the shared medium until the start of the next slot boundary. In some examples, the filler signal 206 may not convey any information. In some examples, the filler signal 206 may convey information regarding the number of timeslots being reserved for DL transmission bursts and the one or more UEs 115 to receive the DL transmission bursts. As depicted, the base station 105 may transmit the filler signal 206 for only a portion of a time slot before sending one or more DL transmission bursts. The base station 105 may establish a guard period during the preceding unused remainder of the time slot. The guard period may be a length of time and may be a constant amount of time occurring after the end of a DL transmission of one or more DL bursts. In one example, the guard period may be a short interframe space (SIFS) of, e.g., 16 micro-seconds. In an example, the base station 105 may signal the guard period via cell specific information (e.g., via a system information block (SIB)), UE-specific information (e.g., radio resource control (RRC)), a physical broadcast channel (PBCH), an L1 signal (e.g., via a physical Control Format Indicator Channel (PCFICH)), a control (e.g., via a Physical Downlink Control Channel (PDCCH)), and any combination thereof.

The filler signal 206 may indicate that the base station 105 is reserving one or more time slots for DL transmission bursts. A transmission burst may send one or more subframes over one or more time slots. A subframe may have the same duration or a different duration than a time slot. If having a different duration, a subframe may be transmitted over an integer number of time slots. In the depicted example, the base station 105 reserves ten timeslots (e.g., between slot ticks 204-a to 204-c on timeline 202) for sending five 200 micro-second subframes, denoted as subframes 208-a to 208-e. In some examples, the subframes 208 and the time slots may be of shorter or longer durations than shown in FIG. 2. One example implementation of FIG. 2 is a base station 105 transmitting a DL burst with no immediate UL response expected. This may occur, e.g., when a base station 105 transmits a discovery reference signal (DRS) to one or more UEs 115.

FIG. 3 illustrates a timeline of an UL-only transmission burst to a base station from a UE's point of view. The base station may be a base station 105 as described in FIGS. 1-2 and may communicate with one or more UEs 115 as also described in FIGS. 1-2. As in the preceding example, the base station 105 may provide a clock with which all UEs 115 are synchronized and may establish time slots within which the base station 105 or a UE 115 may communicate. A time slot is represented in FIG. 3 as the duration of time occurring between two slot ticks 204 along timeline 202, and each time slot may have the same duration. As depicted, one time slot occurs between slot ticks 204-d and 204-e.

Because the transmission medium is shared, the UE 115 may use a filler (F) signal 206 to reserve the transmission medium until the start of an UL transmission burst. In some examples, the filler signal 206 may not convey any information. In some examples, the filler signal 206 may convey information regarding the number of timeslots being reserved for UL transmission bursts and. As depicted, the UE 115 may transmit the filler signal 206 for only a portion of a time slot before sending one or more UL transmission bursts.

The filler signal 206-a may indicate that the UE 115 is reserving one or more time slots for UL transmission bursts. The length of the subframe and time slots may be the same as described above for the base station 105. In the depicted example, the UE 115 reserved six timeslots (e.g., between slot ticks 204-d to 204-f on timeline 202) for sending three 200 micro-second subframes, denoted as subframes 308-a to 208-c. The subframes 308 and the time slots may be of shorter or longer durations than shown in FIG. 3. One example implementation of FIG. 3 is a UE 115 sending an UL burst with no immediate DL response expected from base station 105. This may occur, e.g., when a UE 115 transmits a random access request on physical uplink control channel (PUCCH) resources.

To maintain synchronization with the base station 105, the UE 115 may transmit the filler signal 206-a based at least in part on a timing advance value 310. The timing advance value 310 may account for signal propagation delay due to the geographic distance between a UE 115 and the base station 105. The base station 105 and/or the UE 115 may determine the signal propagation delay by sending a signal to the other, and determining how long it takes the other to respond. When the UE 115 and base station 105 are geographically closer, the signal propagation delay may be shorter and, when geographically farther apart, the signal propagation delay may be longer. The UE 115 may use the timing advance value 310 to determine when to send a signal such that the base station 105 receives the signal at the correct time along timeline 202-a. In FIG. 3, for example, the UE 115 transmits UL burst 208-f prior to slot tick 204-d, in accordance with timing advance value 310, so that base station 105 receives burst 308-a approximately at slot tick 204-d.

FIG. 4 illustrates a timeline of a DL transmission from a base station followed an UL transmission from one or more UEs. The base station may be a base station 105 as described in FIGS. 1-3 and may communicate with one or more UEs 115, as also described in FIGS. 1-3. As in the preceding example, the base station 105 may provide a clock with which all UEs 115 are synchronized and may establish time slots along timeline 202-b within which the base station 105 or a UE 115 may communicate. As described above, a base station 105 may communicate a filler signal 206 preceding a time slot in which base station 105 desires to send one or more DL bursts. In the depicted example, the base station 105 communicates filler signal 206-b prior to slot tick 204-f and thereafter sends five 200 micro-second subframes in DL transmission bursts.

FIG. 4 enlarges a section of timeline 202-b corresponding to brace 402 to illustrate the transition between DL and UL transmissions. An example scenario may be a DL transmission burst followed by an immediate responsive UL burst. For example, a DL data burst may followed by (1) one or more UL acknowledgement (ACK) transmission bursts and/ or UL data transmission bursts, (2) a request to send (RTS) followed by a clear to send (CTS) response followed by a DL data burst, followed by UL ACK transmission burst and/or UL data transmission burst, and the like.

Beginning at slot tick 204-g, the base station 105 may transmit DL transmission burst 208-f, a timing gap 404 occurs, and then one or more UEs 115 may send an UL transmission burst 308-d. The timing gap 404 is used to maintain synchronization between the base station 105 and the one or more UEs 115. In the depicted example, the timing gap 404 constitutes a guard period 406 and a specified length of a filler signal (Fs) 408. The guard period 406 is a length of time starting from the end of a reception of a transmission burst by a communication device (e.g., a base station 105 or UE 115) during which the UEs 115 are not permitted to transmit. The guard period 406 may be a fixed length of time and provide Rx-to-Tx switching time. In some examples, the guard period may be used to control priorities for using the shared medium among different types of transmissions. Following the guard period 406 on timeline 202-b is a length of time during which the UEs 115 may send a filler signal 206. For example, the UE 115 may send the filler signal 206 after expiration of the guard period 406. The specified length of the filler signal 408 may depend on a maximum allowed length of the filler signal configured by a base station 105.

In an example, the base station 105 may determine the maximum allowed length as a function of (1) a maximum round trip signal propagation delay ($RTD_{max}$) between the base station 105 and an edge of a coverage area of the base station 105 and (2) a minimum specified length W of the filler signal 206. In some examples, a communication protocol or standard may specify transmission of certain information-conveying waveform as a part of a filler signal transmission, and the length of the information-conveying portion of the filler waveform may be a specified value, e.g., W. In such a case, the minimum specified length of the filler signal is the length W of the information-conveying portion of the filler waveform. For example, the information-conveying portion of the filler signal 206 may be used to transmit the Wi-Fi RTS, CTS, or CTS-to-self for coexistence with Wi-Fi. In such a scenario, the maximum allowed length of a filler signal may be the sum of the maximum round trip signal propagation delay and the length of the information-conveying portion. To determine $RTD_{max}$, a network provider may specify that the base station 105 has a coverage area of a predetermined distance (e.g., in miles or kilometers), and calculate the maximum round trip signal propagation delay based at least in part on the specified coverage area.

In another example, the base station 105 may determine the maximum allowed length as a function of (1) a maximum round trip signal propagation delay ($RTD_{max}$) between the base station 105 and the UEs 115 and (2) a minimum specified length W of the filler signal 206. In this example, to determine the length of the filler signal 408, the base station 105 may send a signal to each UE 115 and may measure how long it takes to receive a reply. In some instances, a UE 115 that is located farthest away geographically from the base station 105 may have longest round trip signal propagation delay. The base station 105 may select the longest round trip signal propagation delay as $RTD_{max}$.

In an example, the base station 105 may signal the length of the guard period, the maximum allowed length of the filler signal, and the minimum specified length of the filler signal, as cell-specific parameters. These parameters may be semi-static (e.g., constant or changing only occasionally). The base station 105 may issue timing advance/retard commands to each UE 115 to adjust the timing advance value of the UE 115.

More generally, the base station 105 may signal various parameters to the UEs 115 during the DL transmission (e.g., in a particular subframe or DL burst) or prior to the DL transmission using, for example, control, broadcast, or higher layer signaling, or a combination thereof. The parameters may include one or more of the transmission gap 404, a length of the guard period 406, the specified length of the filler signal 408 (e.g., the maximum allowed length of the filler signal), a timing advance value 310 for one or more UE 115, a minimum specified length W of the filler signal, and the like. The signaling may also authorize one or more UEs 115 to attempt to reserve the shared radio frequency spectrum band by transmitting the filler signal 206 of its corresponding identified length. To determine when to send the filler signal 206, the UE 115 may identify an end of the DL transmission and an end of the guard period 406.

The base station 105 may signal the various parameters (e.g., maximum allowed length of the filler signal) via cell specific information (e.g., via a SIB), UE-specific information (e.g., RRC), a PBCH, an L1 signal (e.g., via a physical Control Format Indicator Channel (PCFICH)), a control (e.g., via a PDCCH), and any combination thereof. The UEs 115 may process the various parameters for determining when permitted to send the filler signal 206 and one or more UL bursts. In other examples, the UE 115 may implicitly determine some or all parameters by other signaled parameters without receiving explicit signaling from the base station 105. For example, the maximum allowed length of a filler signal may be implicitly determined as a function of the CP length.

In the depicted example, the enlarged section of timeline 202-b corresponding to brace 402 illustrates activity at two different UEs 115 within the coverage area of base station 105 during the transition between DL and UL transmission bursts. Subtimeline 408-a corresponds to transmission by base station 105 of DL burst 208-f to UE 115-a, and subtimeline 408-b corresponds to transmission by base station 105 of DL burst 208-f to UE 115-b. Subtimeline 410-a corresponds to transmission and reception of bursts by UE 115-a with zero propagation delay, and subtimeline 408-b corresponds to transmission and reception of bursts by UE 115-b with non-zero propagation delay.

With reference to subtimelines 408-a and 408-b, the base station 105 may transmit DL burst 208-f beginning at slot tick 204-g-1, corresponding to slot tick 204-g on timeline 202-b. As can be seen, the base station 105 transmits burst 208-f to each of UE 115-a and 115-b at the same time. Due to propagation delay, UE 115-a and 115-b do not receive the DL burst 208-f at the same time, as shown in subtimelines 410-*a* and 410-*b*, and instead UE 115-*a* receives burst 208-*f* before UE 115-*a*. In the depicted example, the propagation delay is the round trip delay divided by two (e.g., RTD/2). Regardless of whether there is propagation delay, a guard period 406 of the same length occurs in each of subtimelines 410-*a* and 410-*b* at the end of DL burst 208-*f*.

To maintain synchronization, the UEs 115-*a* and 115-*b* account for signal propagation delay when generating a filler signal 206. The temporal length of a filler signal 206 may be governed by the following equation:

$$\text{Length}=(AL_{max}-TA)+W$$

Where $AL_{max}$ is the maximum allowed length of the filler signal as configured by the base station 105, TA is the timing advance value, and W is the minimum specified length of the filler signal 206. $AL_{max}$ and W may be constants that do not change or may change relatively infrequently as compared to changes in TA. The base station 105 may signal any such changes. In an example, TA may change over time as the geographic distance between a UE 115 and the base station 105 changes. $AL_{max}$ and W may be cell-specific parameters, whereas TA may be specific to each UE. The base station 105 may determine the value of $AL_{max}$ based at least in part on considering the maximum round trip delay time of the coverage area, $RTD_{max}$. In an example, $AL_{max}$ may equal $RTD_{max}$.

There may be an inverse relationship between the distance between base station 105 and a UE 115 and the length of the filler signal 206. The closer a UE 115 is to base station 105, the greater the length of the filler signal 206. Conversely, the farther away a UE 115 is to base station 105, the shorter the length of the filler signal 206. If there is zero propagation delay, then the timing advance value TA is zero and the length of the filler signal may be $RTD_{max}+W$, as represented by filler signal 206-*b* in subtimeline 410-*a*. The identified length of a filler signal may be the minimum length W if a UE 115 is at the edge of the coverage area (e.g., having the longest possible propagation delay), and in that case $RTD_{max}=TA$. In some examples, a UE 115 may calculate its timing advance value 310 based at least in part on transmitting one or more signals and receiving one or more replies from the base station 105. In other examples, the base station 105 may adjust, based at least in part on whether the received timing of the uplink transmission from the UE is too early or too late, the timing advance value 310 of each UE 115 via sending timing advance/retard commands to the UE. In another example, instead of sending TA to the UE, the base station 105 may directly calculate the length of the filler signal 206 for each UE 115 and signal the calculated filler signal length during a DL transmission or via control, broadcast, or higher layer signaling. In yet other examples, both the base station 105 and one or more of the UEs 115 may calculate the timing advance value 310, and may signal the calculations to each other.

Once the length of the filler signal has been identified, a UE 115 may transmit the filler signal of the identified length to attempt to reserve the shared radio frequency spectrum band. As seen by comparing subtimeline 410-*a* and 410-*b*, the length of the filler signal 206-*c* is longer than the length of filler signal 206-*d*, due to UE 115-*a* having zero propagation delay and UE 115-*b* having non-zero propagation delay. After transmitting the filler signal of the identified length, a UE 115 may transmit an UL transmission burst to the base station 105. As seen by comparing subtimeline 410-*a* and 410-*b*, UE 115-*a* transmits its UL burst 308-*d* later in time as compared to when UE 115-*b* transmits. Because this difference in transmission time is to account for signal propagation delay, the base station 105 receives the UL bursts 308-*d* at the same time, as can be seen by comparing UL bursts 308-*d* in subtimeline 412-*a* and 412-*b*. Dashed line 412-1 represents the end of the enlarged section of timeline 202-*b*.

In the depicted example, the length of the transmission gap 404 is greater than one time slot on timeline 202-*b*, thus resulting in the end of UL transmission burst 308-*d*, as well as subsequent UL transmission bursts 308-*e* and 308-*f*, being offset from the slot ticks. In other examples, the length of the timing gap 404 may be the same length as or shorter than the length of a time slot.

From the base station's perspective, after an end of the downlink transmission (e.g., after sending DL burst 208-*f*), the base station 105 may begin processing the shared radio frequency spectrum searching for an uplink transmission from at least one of the UEs 115 after a length of time corresponding to a sum of a length of the guard period 406 and a length specified by the maximum allowed length of the filler signal (e.g., $AL_{max}+W$).

Over time, the identified length of a UE's 115 filler signal 206 may change due to changes to the timing advance values 310. For example, the filler signal 206 may be composed of a fixed length portion and a variable length portion. The length of the fixed length portion may be the minimum specified length W of the filler signal. The length of the variable length portion may change as the distance between a UE 115 and the base station 105 changes. The UE 115 (or the base station 105) may determine an updated timing advance value (e.g., periodically or aperiodically) and the updated timing advance value may be used for determining the length of the filler signal for the UE 115.

Similar to the description provided above, after a timing advance value 310 has been updated, the UE 115 may identify the updated timing advance value 310 and may identify an updated length of the filler signal 206 based at least in part on the maximum allowed length of the filler signal and the updated timing advance value. The UE 115 may then transmit a subsequent filler signal 206 of the updated length during a subsequent transmission gap 404 occurring between a subsequent downlink transmission and a subsequent uplink transmission, and transmit the subsequent uplink transmission subsequent to the transmission of the subsequent filler signal 206.

Figure 5:
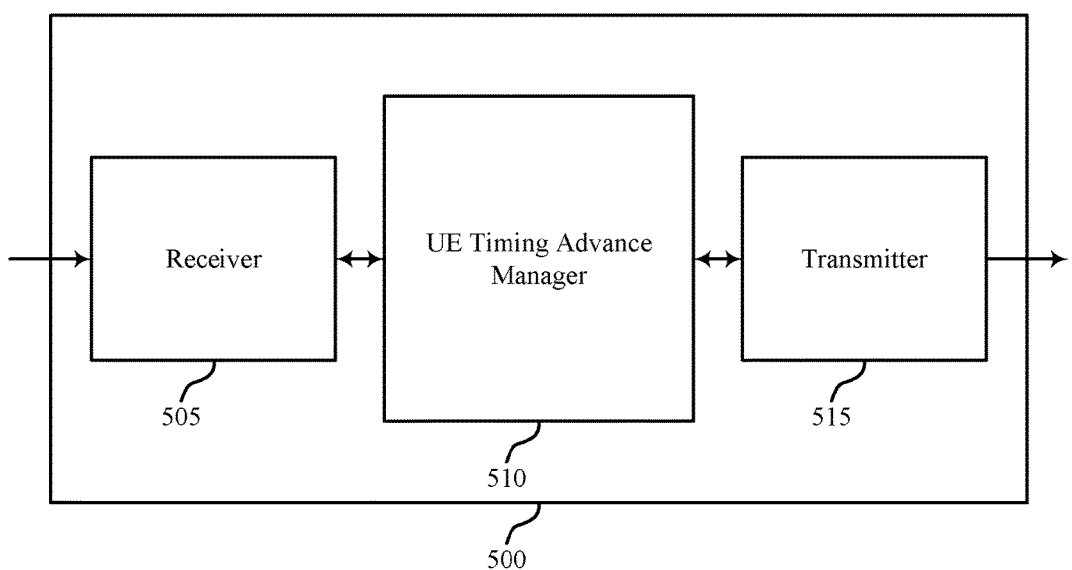
FIGS. 5 through 7 show block diagrams of a wireless device that supports timing advance design in accordance with one or more aspects of the present disclosure.

FIG. 5 shows a block diagram of a wireless device 500 that supports timing advance design for eCC in accordance with various aspects of the present disclosure. Wireless device 500 may be an example of aspects of a UE 115 described with reference to FIGS. 1 and 2. Wireless device 500 may include receiver 505, UE timing advance manager 510 and transmitter 515. Wireless device 500 may also include a processor. Each of these components may be in communication with each other.

The receiver 505 may receive information such as packets, user data, or control information associated with various information channels (e.g., control channels, data channels, and information related to timing advance design for eCC, etc.). Information may be passed on to other components of the device. The receiver 505 may be an example of aspects of the transceiver 825 described with reference to FIG. 8.

The UE timing advance manager 510 may identify a length of a filler signal based at least in part on a maximum allowed length of the filler signal configured by a base station, transmit the filler signal of the identified length to reserve access to a shared radio frequency (RF) spectrum band, the filler signal transmitted during a transmission gap that occurs between a DL transmission and an UL transmission in TDD, and transmit the UL transmission on the reserved shared RF spectrum band subsequent to the transmission of the filler signal. The UE timing advance manager 510 may also be an example of aspects of the UE timing advance manager 805 described with reference to FIG. 8.

The transmitter 515 may transmit signals received from other components of wireless device 500. In some examples, the transmitter 515 may be collocated with a receiver in a transceiver module. For example, the transmitter 515 may be an example of aspects of the transceiver 825 described with reference to FIG. 8. The transmitter 515 may include a single antenna, or it may include a plurality of antennas.

Figure 6:
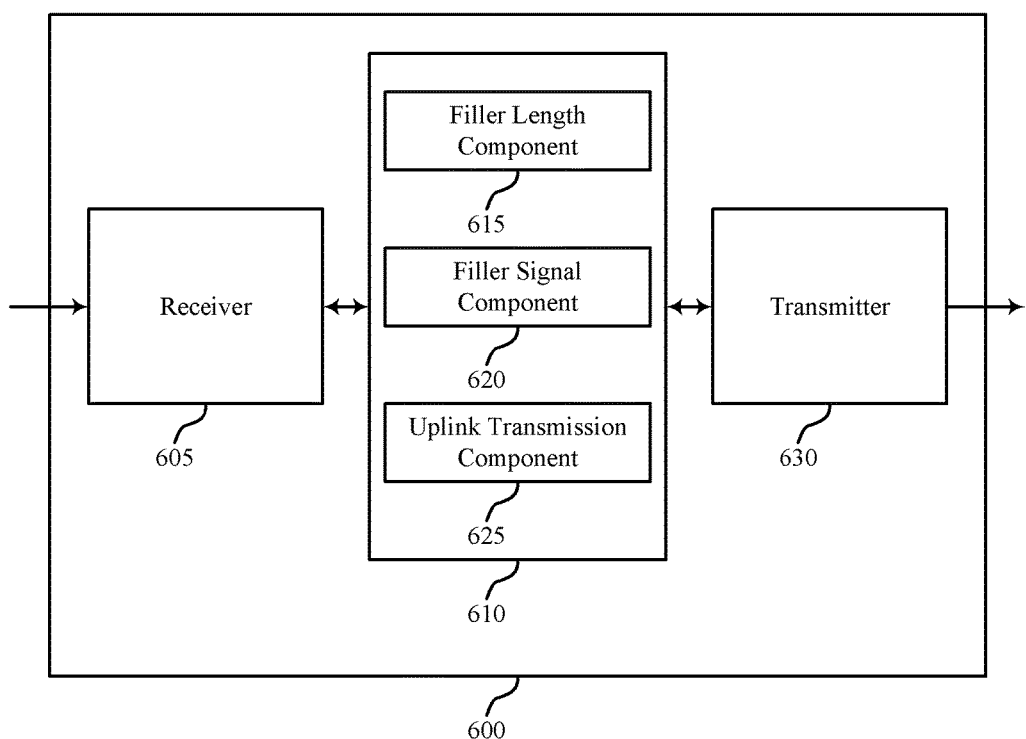

FIG. 6 shows a block diagram of a wireless device 600 that supports timing advance design for eCC in accordance with various aspects of the present disclosure. Wireless device 600 may be an example of aspects of a wireless device 500 or a UE 115 described with reference to FIGS. 1, 2 and 5. Wireless device 600 may include receiver 605, UE timing advance manager 610 and transmitter 630. Wireless device 600 may also include a processor. Each of these components may be in communication with each other.

The receiver 605 may receive information which may be passed on to other components of the device. The receiver 605 may also perform the functions described with reference to the receiver 505 of FIG. 5. The receiver 605 may be an example of aspects of the transceiver 825 described with reference to FIG. 8.

The UE timing advance manager 610 may be an example of aspects of UE timing advance manager 510 described with reference to FIG. 5. The UE timing advance manager 610 may include filler length component 615, filler signal component 620 and uplink transmission component 625. The UE timing advance manager 610 may be an example of aspects of the UE timing advance manager 805 described with reference to FIG. 8.

The filler length component 615 may derive a maximum allowed length of the filler signal from a parameter configured by the base station, identify an updated length of the filler signal based at least in part on the maximum allowed length of the filler signal and the updated timing advance value, and identify a length of a filler signal based at least in part on a maximum allowed length of the filler signal configured by a base station.

In some cases, the identified length of the filler signal is based at least in part on a timing advance value, the timing advance value based at least in part on a propagation delay between a UE and the base station. In some cases, the identified length of the filler signal is based at least in part on a difference between the maximum allowed length of the filler signal and the timing advance value. In some cases, the filler signal is composed of a fixed length portion and a variable length portion.

In some cases, the fixed length portion has a minimum specified length for the filler signal and the variable length portion has a length determined based at least in part on an update to the timing advance value. In some cases, the maximum allowed length of the filler signal and the guard period length are constants. In some cases, the maximum allowed length of the filler signal corresponds to a length of a maximum round trip signal delay between the base station and an edge of a coverage area of the base station.

The filler signal component 620 may transmit a subsequent filler signal of the updated length during a subsequent transmission gap occurring between a subsequent DL transmission and a subsequent UL transmission, and transmit the filler signal of the identified length to reserve access to a shared RF spectrum band. The filler signal may be transmitted during a transmission gap that occurs between a DL transmission and an UL transmission in TDD. In some cases, a length of the transmission gap is a based at least in part on a length of a guard period, the timing advance value, and the maximum allowed length of the filler signal. In some cases, the length of the transmission gap varies over time due to changes to the identified length of the filler signal based at least in part on updates to the timing advance value.

The uplink transmission component 625 may transmit the subsequent UL transmission subsequent to the transmission of the subsequent filler signal, and transmit the UL transmission on the reserved shared RF spectrum band subsequent to the transmission of the filler signal.

The transmitter 630 may transmit signals received from other components of wireless device 600. In some examples, the transmitter 630 may be collocated with a receiver in a transceiver module. For example, the transmitter 630 may be an example of aspects of the transceiver 825 described with reference to FIG. 8. The transmitter 630 may utilize a single antenna, or it may utilize a plurality of antennas.

Figure 7:
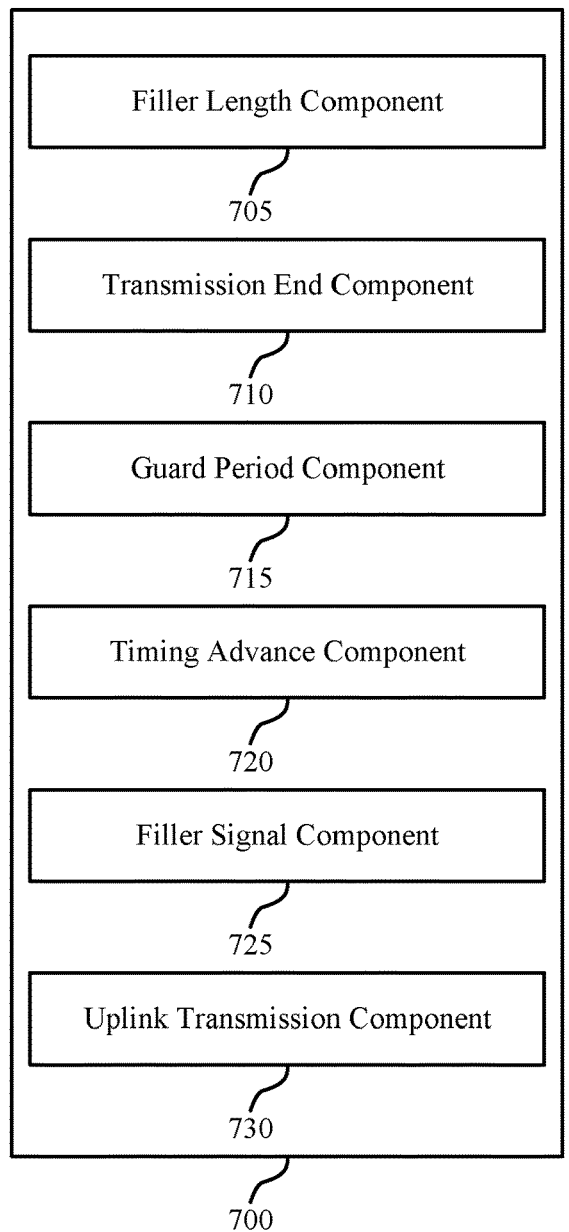

FIG. 7 shows a block diagram of a UE timing advance manager 700 which may be an example of the corresponding component of wireless device 500 or wireless device 600. That is, UE timing advance manager 700 may be an example of aspects of UE timing advance manager 510 or UE timing advance manager 610 described with reference to FIGS. 5 and 6. The UE timing advance manager 700 may also be an example of aspects of the UE timing advance manager 805 described with reference to FIG. 8.

The UE timing advance manager 700 may include filler length component 705, transmission end component 710, guard period component 715, timing advance component 720, filler signal component 725 and uplink transmission component 730. Each of these modules may communicate, directly or indirectly, with one another (e.g., via one or more buses).

The filler length component 705 may derive the maximum allowed length of the filler signal from a parameter configured by the base station and identify an updated length of the filler signal based at least in part on the maximum allowed length of the filler signal and the updated timing advance value. Further, the filler length component 705 may identify a length of a filler signal based at least in part on a maximum allowed length of the filler signal configured by a base station.

The transmission end component 710 may identify an end of the DL transmission and a beginning of the guard period length. The guard period component 715 may determine that the guard period length has expired prior to transmitting the filler signal.

The timing advance component 720 may identify an updated timing advance value. The filler signal component 725 may transmit a subsequent filler signal of the updated length during a subsequent transmission gap occurring between a subsequent DL transmission and a subsequent UL transmission, and transmit the filler signal of the identified length to reserve access to a shared RF spectrum band. The filler signal may be transmitted during a transmission gap that occurs between a DL transmission and an UL transmission in TDD.

The uplink transmission component 730 may transmit the subsequent UL transmission subsequent to the transmission of the subsequent filler signal, and transmit the UL transmission on the reserved shared RF spectrum band subsequent to the transmission of the filler signal.

Figure 8:
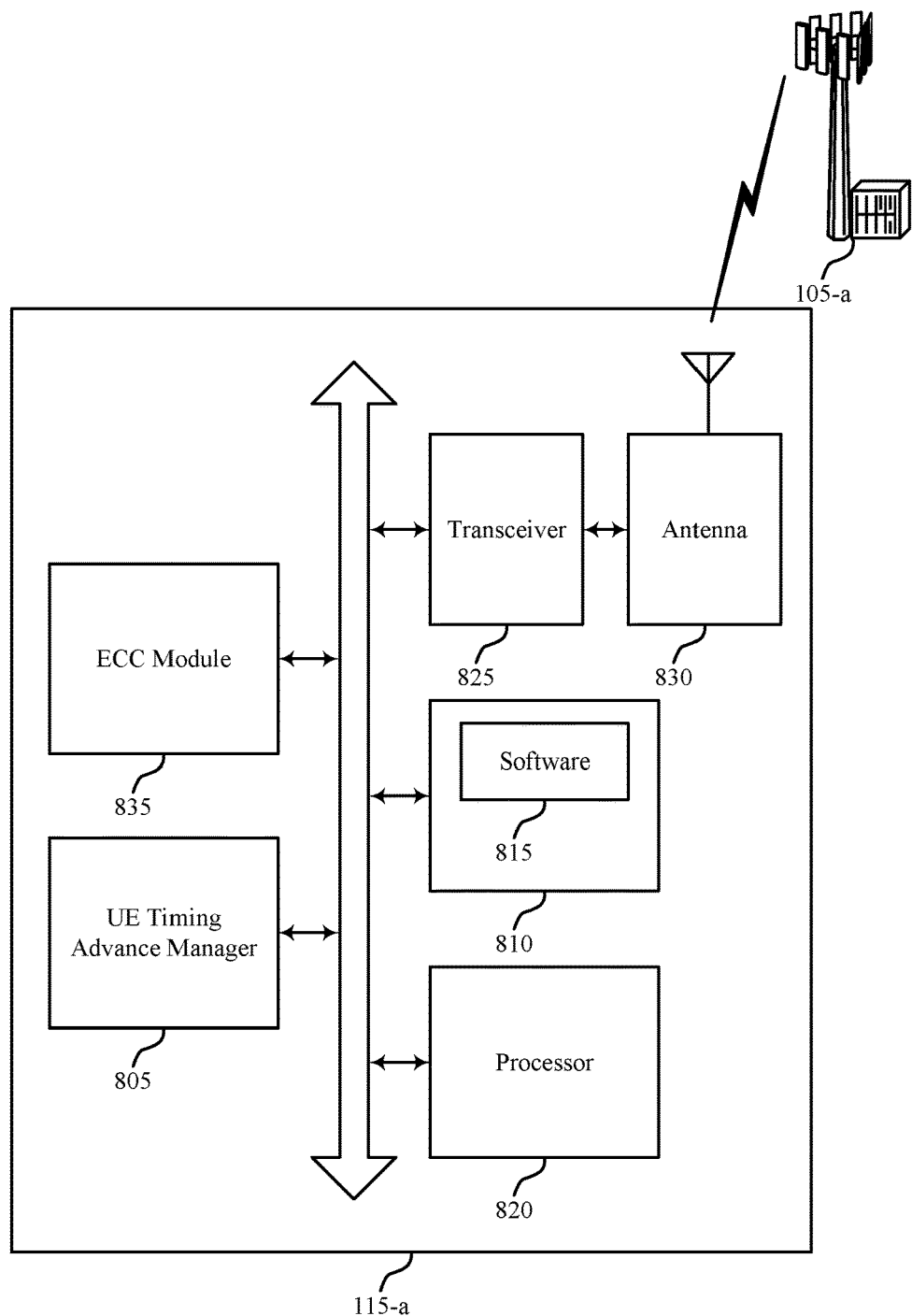
FIG. 8 illustrates a block diagram of a system including a user equipment (UE) that supports timing advance design in accordance with one or more aspects of the present disclosure.

FIG. 8 shows a diagram of a system 800 including a device that supports timing advance design for eCC in accordance with various aspects of the present disclosure. For example, system 800 may include UE 115-*a*, which may be an example of a wireless device 500, a wireless device 600, or a UE 115 as described with reference to FIGS. 1, 2 and 5 through 7.

UE 115-*a* may also include UE timing advance manager 805, memory 810, processor 820, transceiver 825, antenna 830 and eCC module 835. Each of these modules may communicate, directly or indirectly, with one another (e.g., via one or more buses). The UE timing advance manager 805 may be an example of a UE timing advance manager as described with reference to FIGS. 5 through 7.

The memory 810 may include random access memory (RAM) and read only memory (ROM). The memory 810 may store computer-readable, computer-executable software including instructions that, when executed, cause the processor to perform various functions described herein (e.g., timing advance design for eCC, etc.). In some cases, the software 815 may not be directly executable by the processor but may cause a computer (e.g., when compiled and executed) to perform functions described herein. The processor 820 may include an intelligent hardware device, (e.g., a central processing unit (CPU), a microcontroller, an application specific integrated circuit (ASIC), etc.)

The transceiver 825 may communicate bi-directionally, via one or more antennas, wired, or wireless links, with one or more networks, as described above. For example, the transceiver 825 may communicate bi-directionally with a base station 105 or a UE 115. The transceiver 825 may also include a modem to modulate the packets and provide the modulated packets to the antennas for transmission, and to demodulate packets received from the antennas. In some cases, the wireless device may include a single antenna 830. However, in some cases the device may have more than one antenna 830, which may be capable of concurrently transmitting or receiving multiple wireless transmissions.

eCC module 835 may enable operations using eCCs such as communication using shared or unlicensed spectrum, using reduced TTIs or subframe durations, or using a large number of component carriers as described above with reference to FIG. 1.

Figure 9:
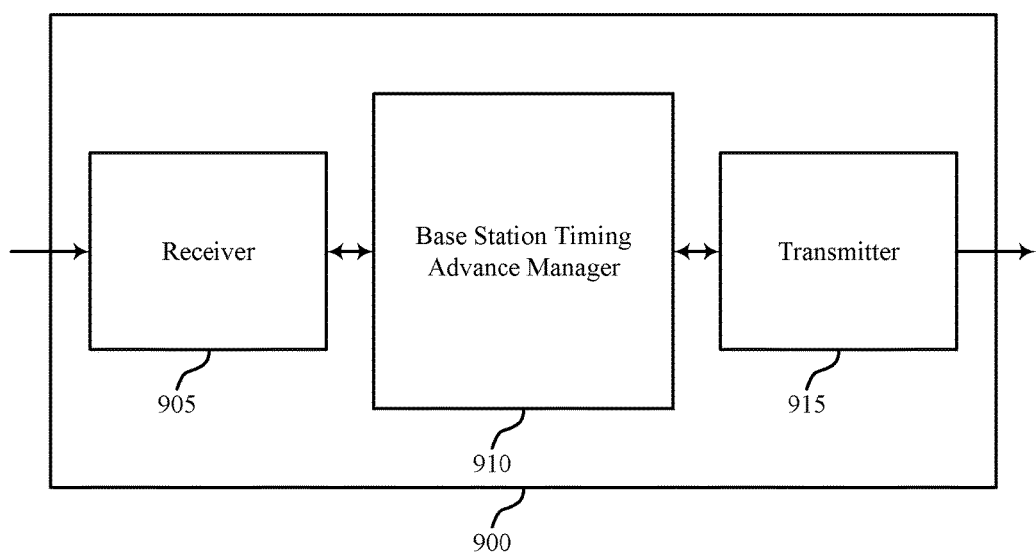
FIGS. 9 through 11 show block diagrams of a wireless device that supports timing advance design in accordance with one or more aspects of the present disclosure.

FIG. 9 shows a block diagram of a wireless device 900 that supports timing advance design for eCC in accordance with various aspects of the present disclosure. Wireless device 900 may be an example of aspects of a base station 105 described with reference to FIGS. 1 and 2. Wireless device 900 may include receiver 905, base station timing advance manager 910 and transmitter 915. Wireless device 900 may also include a processor. Each of these components may be in communication with each other.

The receiver 905 may receive information such as packets, user data, or control information associated with various information channels (e.g., control channels, data channels, and information related to timing advance design for eCC, etc.). Information may be passed on to other components of the device. The receiver 905 may be an example of aspects of the transceiver 1225 described with reference to FIG. 12.

The base station timing advance manager 910 may determine a maximum allowed length of a filler signal for a coverage area of the base station. The base station may be configured to communicate with a set of UEs within the coverage area on a shared RF spectrum band using TDD, and transmit, to at least one of the UEs, the maximum allowed length of the filler signal and authorization to attempt to reserve the shared RF spectrum band by transmitting the filler signal during a transmission gap subsequent to an end of a DL transmission. The base station timing advance manager 910 may also be an example of aspects of the base station timing advance manager 1205 described with reference to FIG. 12.

The transmitter 915 may transmit signals received from other components of wireless device 900. In some examples, the transmitter 915 may be collocated with a receiver in a transceiver module. For example, the transmitter 915 may be an example of aspects of the transceiver 1225 described with reference to FIG. 12. The transmitter 915 may include a single antenna, or it may include a plurality of antennas.

Figure 10:
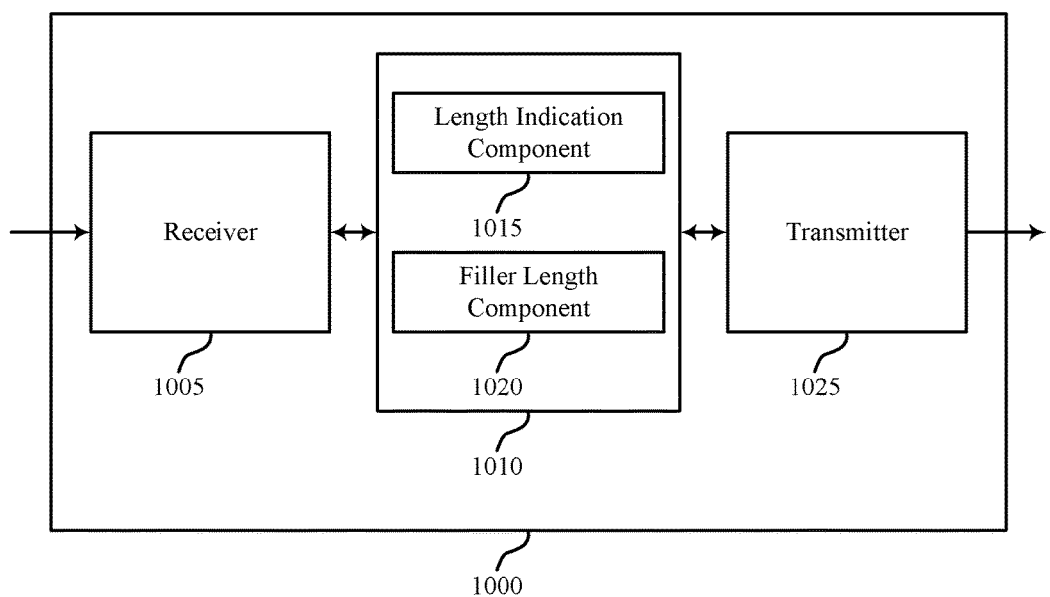

FIG. 10 shows a block diagram of a wireless device 1000 that supports timing advance design for eCC in accordance with various aspects of the present disclosure. Wireless device 1000 may be an example of aspects of a wireless device 900 or a base station 105 described with reference to FIGS. 1, 2 and 9. Wireless device 1000 may include receiver 1005, base station timing advance manager 1010 and transmitter 1025. Wireless device 1000 may also include a processor. Each of these components may be in communication with each other.

The receiver 1005 may receive information which may be passed on to other components of the device. The receiver 1005 may also perform the functions described with reference to the receiver 905 of FIG. 9. The receiver 1005 may be an example of aspects of the transceiver 1225 described with reference to FIG. 12.

The base station timing advance manager 1010 may be an example of aspects of base station timing advance manager 910 described with reference to FIG. 9. The base station timing advance manager 1010 may include length indication component 1015 and filler length component 1020. The base station timing advance manager 1010 may be an example of aspects of the base station timing advance manager 1205 described with reference to FIG. 12.

The length indication component 1015 may transmit, to at least one of the UEs, the maximum allowed length of the filler signal and authorization to attempt to reserve the shared RF spectrum band by transmitting the filler signal during a transmission gap subsequent to an end of a DL transmission.

In some cases, the transmitting of the maximum allowed length of the filler signal occurs prior to the DL transmission via broadcast signaling or higher layer signaling. In some cases, the transmitting of the maximum allowed length of the filler signal is part of the DL transmission. In some cases, the authorization authorizes the at least one UE to attempt to reserve the shared RF spectrum band by transmitting the filler signal of the identified length. In some cases, the authorization identifies at least one of a length of the transmission gap, the identified length of the filler signal, a length of a guard period, or a combination thereof. In some cases, the transmission gap is based at least in part on a guard period length and the maximum allowed length of the filler signal.

The filler length component 1020 may determine a maximum allowed length of a filler signal for a coverage area of the base station. The base station may be configured to communicate with a set of UEs within the coverage area on a shared RF spectrum band using TDD. The filler length component 1020 may then identify a length of the filler signal for the at least one UE based at least in part on the maximum allowed length of the filler signal and the timing advance value. In some cases, the maximum allowed length of the filler signal corresponds to a length of a maximum round trip signal delay between an edge of the coverage area and the base station.

The transmitter 1025 may transmit signals received from other components of wireless device 1000. In some examples, the transmitter 1025 may be collocated with a receiver in a transceiver module. For example, the transmitter 1025 may be an example of aspects of the transceiver 1225 described with reference to FIG. 12. The transmitter 1025 may utilize a single antenna, or it may utilize a plurality of antennas.

Figure 11:
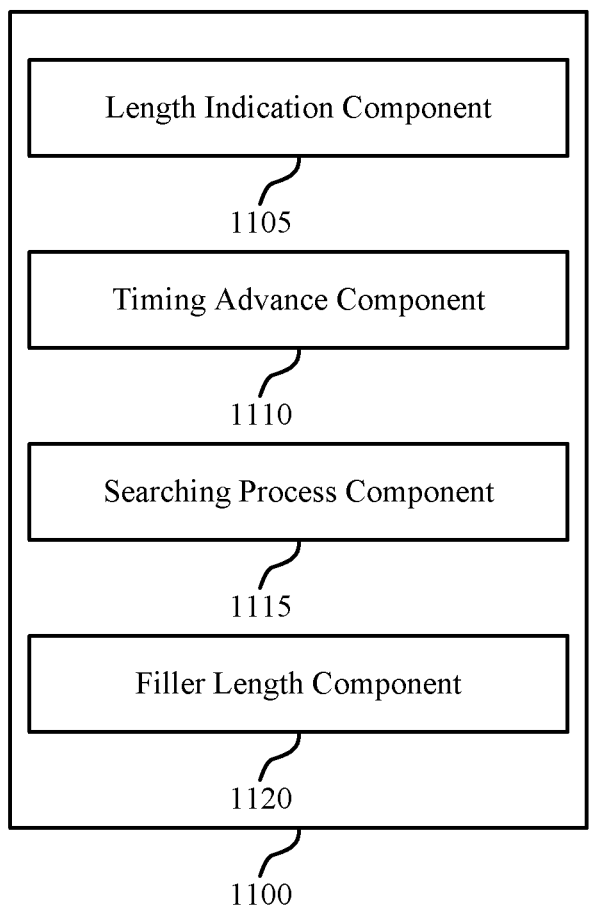

FIG. 11 shows a block diagram of a base station timing advance manager 1100 which may be an example of the corresponding component of wireless device 900 or wireless device 1000. That is, base station timing advance manager 1100 may be an example of aspects of base station timing advance manager 910 or base station timing advance manager 1010 described with reference to FIGS. 9 and 10. The base station timing advance manager 1100 may also be an example of aspects of the base station timing advance manager 1205 described with reference to FIG. 12.

The base station timing advance manager 1100 may include length indication component 1105, timing advance component 1110, searching process component 1115 and filler length component 1120. Each of these modules may communicate, directly or indirectly, with one another (e.g., via one or more buses).

The length indication component 1105 may transmit, to at least one of the UEs, the maximum allowed length of the filler signal and authorization to attempt to reserve the shared RF spectrum band by transmitting the filler signal during a transmission gap subsequent to an end of a DL transmission.

The timing advance component 1110 may identify a timing advance value for the at least one UE based at least in part on propagation delay between the base station and the at least one UE.

The searching process component 1115 may begin, after an end of the DL transmission, to process the shared RF spectrum searching for an UL transmission from the at least one UE after a length corresponding to a sum of a guard period length and a length specified by the maximum allowed length of the filler signal.

The filler length component 1120 may determine a maximum allowed length of a filler signal for a coverage area of the base station, the base station configured to communicate with a set of UEs within the coverage area on a shared RF spectrum band using TDD, and identify a length of the filler signal for the at least one UE based at least in part on the maximum allowed length of the filler signal and the timing advance value. In some cases, the maximum allowed length of the filler signal corresponds to a length of a maximum round trip signal delay between an edge of the coverage area and the base station.

Figure 12:
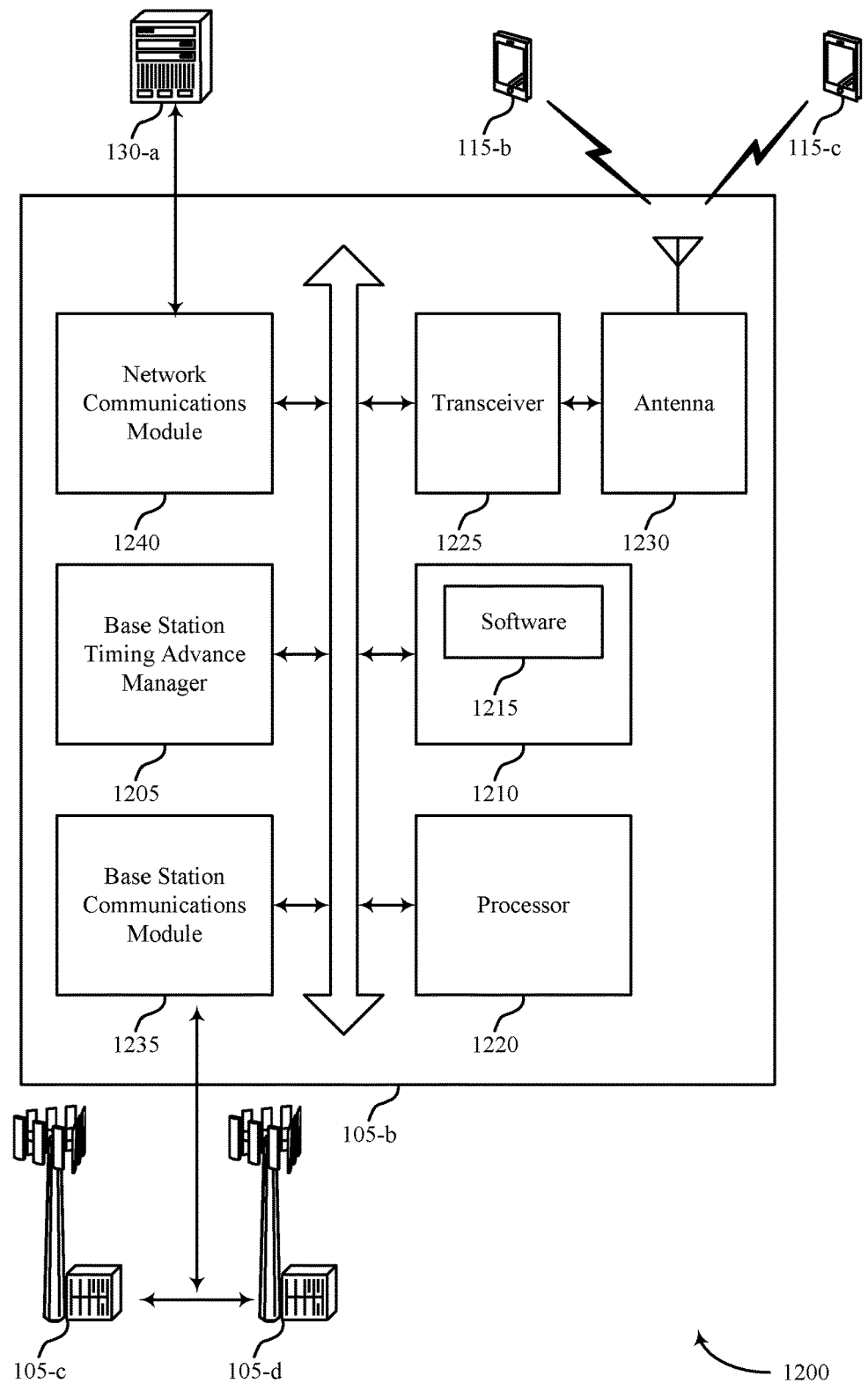
FIG. 12 illustrates a block diagram of a system including a base station that supports timing advance design in accordance with one or more aspects of the present disclosure.

FIG. 12 shows a diagram of a wireless system 1200 including a device configured that supports timing advance design for eCC in accordance with various aspects of the present disclosure. For example, wireless system 1200 may include base station 105-*b*, which may be an example of a wireless device 900, a wireless device 1000, or a base station 105 as described with reference to FIGS. 1, 2 and 9 through 11. Base station 105-*b* may also include components for bi-directional voice and data communications including components for transmitting communications and components for receiving communications. For example, base station 105-*b* may communicate bi-directionally with one or more UEs 115.

Base station 105-*b* may also include base station timing advance manager 1205, memory 1210, processor 1220, transceiver 1225, antenna 1230, base station communications module 1235 and network communications module 1240. Each of these modules may communicate, directly or indirectly, with one another (e.g., via one or more buses). The base station timing advance manager 1205 may be an example of a base station timing advance manager as described with reference to FIGS. 9 through 11.

The memory 1210 may include RAM and ROM. The memory 1210 may store computer-readable, computer-executable software including instructions that, when executed, cause the processor to perform various functions described herein (e.g., timing advance design for eCC, etc.). In some cases, the software 1215 may not be directly executable by the processor but may cause a computer (e.g., when compiled and executed) to perform functions described herein. The processor 1220 may include an intelligent hardware device, (e.g., a CPU, a microcontroller, an ASIC, etc.)

The transceiver 1225 may communicate bi-directionally, via one or more antennas, wired, or wireless links, with one or more networks, as described above. For example, the transceiver 1225 may communicate bi-directionally with a base station 105 or a UE 115. The transceiver 1225 may also include a modem to modulate the packets and provide the modulated packets to the antennas for transmission, and to demodulate packets received from the antennas. In some cases, the wireless device may include a single antenna 1230. However, in some cases the device may have more than one antenna 830, which may be capable of concurrently transmitting or receiving multiple wireless transmissions.

The base station communications module 1235 may manage communications with other base station 105, and may include a controller or scheduler for controlling communications with UEs 115 in cooperation with other base stations 105. For example, the base station communications module 1235 may coordinate scheduling for transmissions to UEs 115 for various interference mitigation techniques such as beamforming or joint transmission. In some examples, base station communications module-95 may provide an X2 interface within an LTE/LTE-A wireless communication network technology to provide communication between base stations 105.

The network communications module 1240 may manage communications with the core network (e.g., via one or more wired backhaul links). For example, the network communications module 1240 may manage the transfer of data communications for client devices, such as one or more UEs 115.

Figure 13:
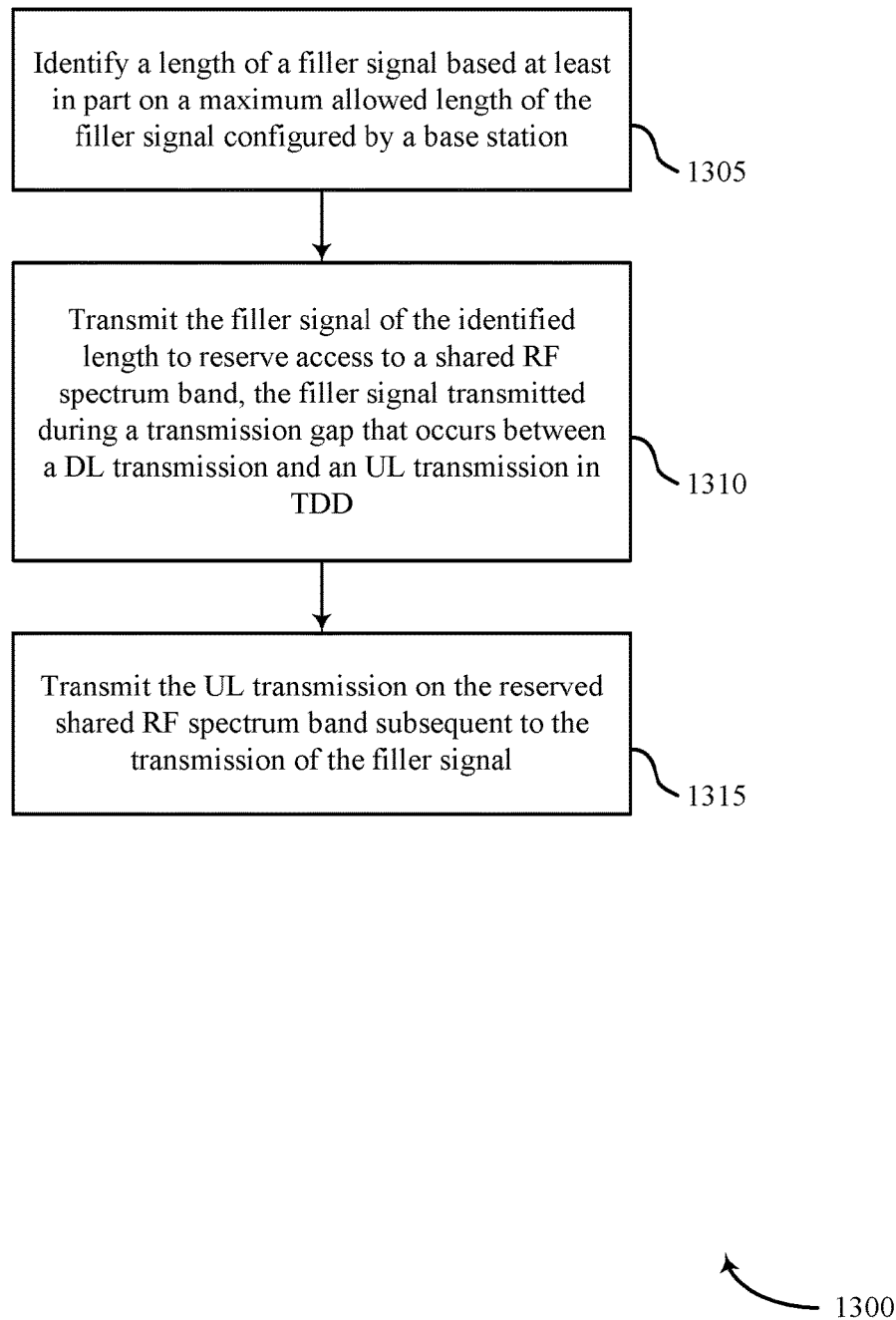
FIGS. 13 through 17 illustrate methods for timing advance design in accordance with one or more aspects of the present disclosure.

FIG. 13 shows a flowchart illustrating a method 1300 for timing advance design for eCC in accordance with various aspects of the present disclosure. The operations of method 1300 may be implemented by a device such as a UE 115 or its components as described with reference to FIGS. 1 and 2. For example, the operations of method 1300 may be performed by the UE timing advance manager as described herein. In some examples, the UE 115 may execute a set of codes to control the functional elements of the device to perform the functions described below. Additionally or alternatively, the UE 115 may perform aspects the functions described below using special-purpose hardware.

At block 1305, the UE 115 may identify a length of a filler signal based at least in part on a maximum allowed length of the filler signal configured by a base station as described above with reference to FIGS. 2 through 4. In certain examples, the operations of block 1305 may be performed by the filler length component as described with reference to FIGS. 6 and 7.

At block 1310, the UE 115 may transmit the filler signal of the identified length to reserve access to a shared RF spectrum band, the filler signal transmitted during a transmission gap that occurs between a DL transmission and an UL transmission in TDD as described above with reference to FIGS. 2 through 4. In certain examples, the operations of block 1310 may be performed by the filler signal component as described with reference to FIGS. 6 and 7.

At block 1315, the UE 115 may transmit the UL transmission on the reserved shared RF spectrum band subsequent to the transmission of the filler signal as described above with reference to FIGS. 2 through 4. In certain examples, the operations of block 1315 may be performed by the uplink transmission component as described with reference to FIGS. 6 and 7.

Figure 14:
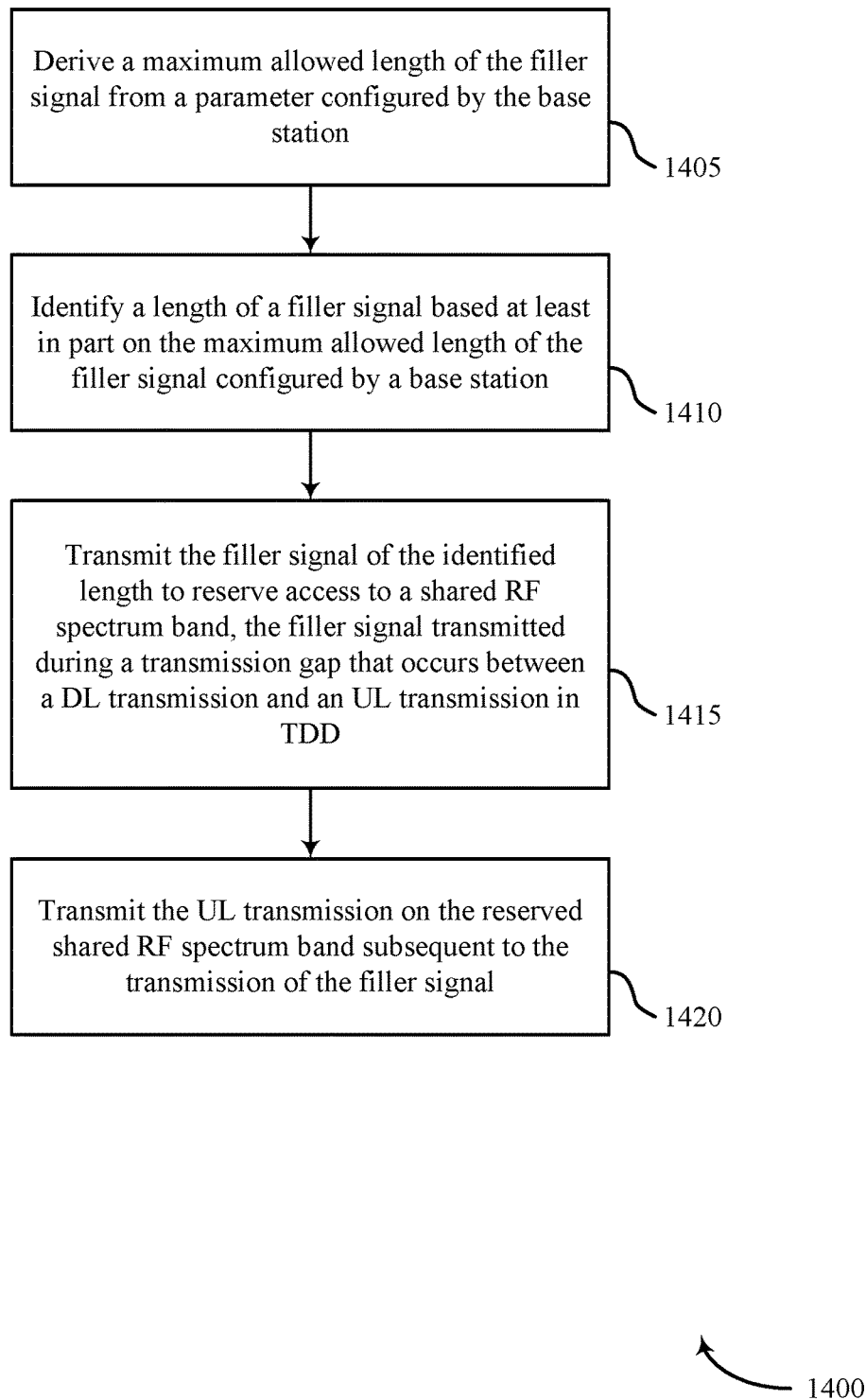

FIG. 14 shows a flowchart illustrating a method 1400 for timing advance design for eCC in accordance with various aspects of the present disclosure. The operations of method 1400 may be implemented by a device such as a UE 115 or its components as described with reference to FIGS. 1 and 2. For example, the operations of method 1400 may be performed by the UE timing advance manager as described herein. In some examples, the UE 115 may execute a set of codes to control the functional elements of the device to perform the functions described below. Additionally or alternatively, the UE 115 may perform aspects the functions described below using special-purpose hardware.

At block 1405, the UE 115 may derive the maximum allowed length of the filler signal from a parameter configured by the base station as described above with reference to FIGS. 2 through 4. In certain examples, the operations of block 1405 may be performed by the filler length component as described with reference to FIGS. 6 and 7.

At block 1410, the UE 115 may identify a length of a filler signal based at least in part on a maximum allowed length of the filler signal configured by a base station as described above with reference to FIGS. 2 through 4. In certain examples, the operations of block 1410 may be performed by the filler length component as described with reference to FIGS. 6 and 7.

At block 1415, the UE 115 may transmit the filler signal of the identified length to reserve access to a shared RF spectrum band, the filler signal transmitted during a transmission gap that occurs between a DL transmission and an UL transmission in TDD as described above with reference to FIGS. 2 through 4. In certain examples, the operations of block 1415 may be performed by the filler signal component as described with reference to FIGS. 6 and 7.

At block 1420, the UE 115 may transmit the UL transmission on the reserved shared RF spectrum band subsequent to the transmission of the filler signal as described above with reference to FIGS. 2 through 4. In certain examples, the operations of block 1420 may be performed by the uplink transmission component as described with reference to FIGS. 6 and 7.

Figure 15:
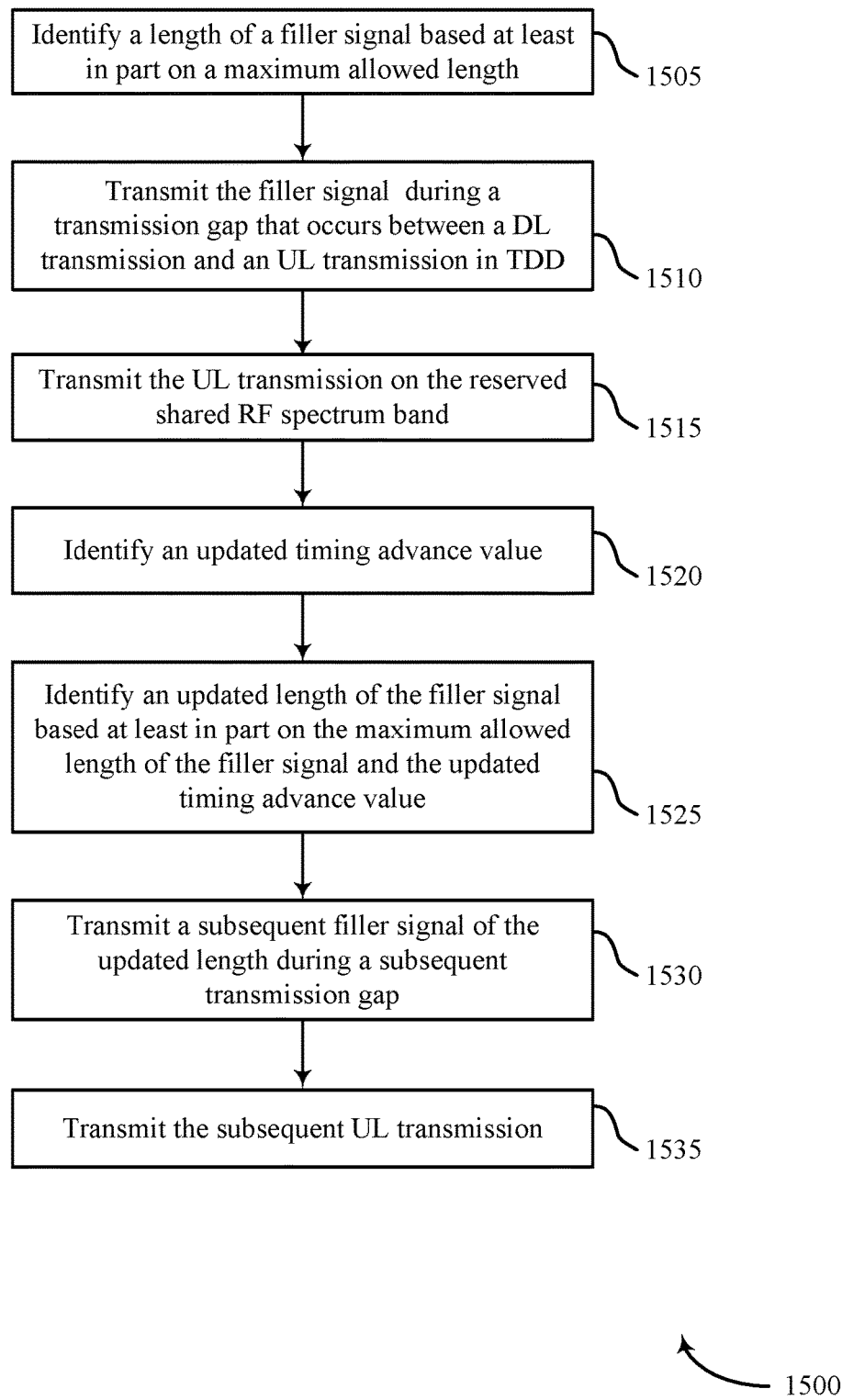

FIG. 15 shows a flowchart illustrating a method 1500 for timing advance design for eCC in accordance with various aspects of the present disclosure. The operations of method 1500 may be implemented by a device such as a UE 115 or its components as described with reference to FIGS. 1 and 2. For example, the operations of method 1500 may be performed by the UE timing advance manager as described herein. In some examples, the UE 115 may execute a set of codes to control the functional elements of the device to perform the functions described below. Additionally or alternatively, the UE 115 may perform aspects the functions described below using special-purpose hardware.

At block 1505, the UE 115 may identify a length of a filler signal based at least in part on a maximum allowed length of the filler signal configured by a base station as described above with reference to FIGS. 2 through 4. In some cases, the identified length of the filler signal is based at least in part on a timing advance value, the timing advance value based at least in part on a propagation delay between a UE and the base station. In certain examples, the operations of block 1505 may be performed by the filler length component as described with reference to FIGS. 6 and 7.

At block 1510, the UE 115 may transmit the filler signal of the identified length to reserve access to a shared RF spectrum band, the filler signal transmitted during a transmission gap that occurs between a DL transmission and an UL transmission in TDD as described above with reference to FIGS. 2 through 4. In certain examples, the operations of block 1510 may be performed by the filler signal component as described with reference to FIGS. 6 and 7.

At block 1515, the UE 115 may transmit the UL transmission on the reserved shared RF spectrum band subsequent to the transmission of the filler signal as described above with reference to FIGS. 2 through 4. In certain examples, the operations of block 1515 may be performed by the uplink transmission component as described with reference to FIGS. 6 and 7.

At block 1520, the UE 115 may identify an updated timing advance value as described above with reference to FIGS. 2 through 4. In certain examples, the operations of block 1520 may be performed by the timing advance component as described with reference to FIGS. 6 and 7.

At block 1525, the UE 115 may identify an updated length of the filler signal based at least in part on the maximum allowed length of the filler signal and the updated timing advance value as described above with reference to FIGS. 2 through 4. In certain examples, the operations of block 1525 may be performed by the filler length component as described with reference to FIGS. 6 and 7.

At block 1530, the UE 115 may transmit a subsequent filler signal of the updated length during a subsequent transmission gap occurring between a subsequent DL transmission and a subsequent UL transmission as described above with reference to FIGS. 2 through 4. In certain examples, the operations of block 1530 may be performed by the filler signal component as described with reference to FIGS. 6 and 7.

At block 1535, the UE 115 may transmit the subsequent UL transmission subsequent to the transmission of the subsequent filler signal as described above with reference to FIGS. 2 through 4. In certain examples, the operations of block 1535 may be performed by the uplink transmission component as described with reference to FIGS. 6 and 7.

Figure 16:
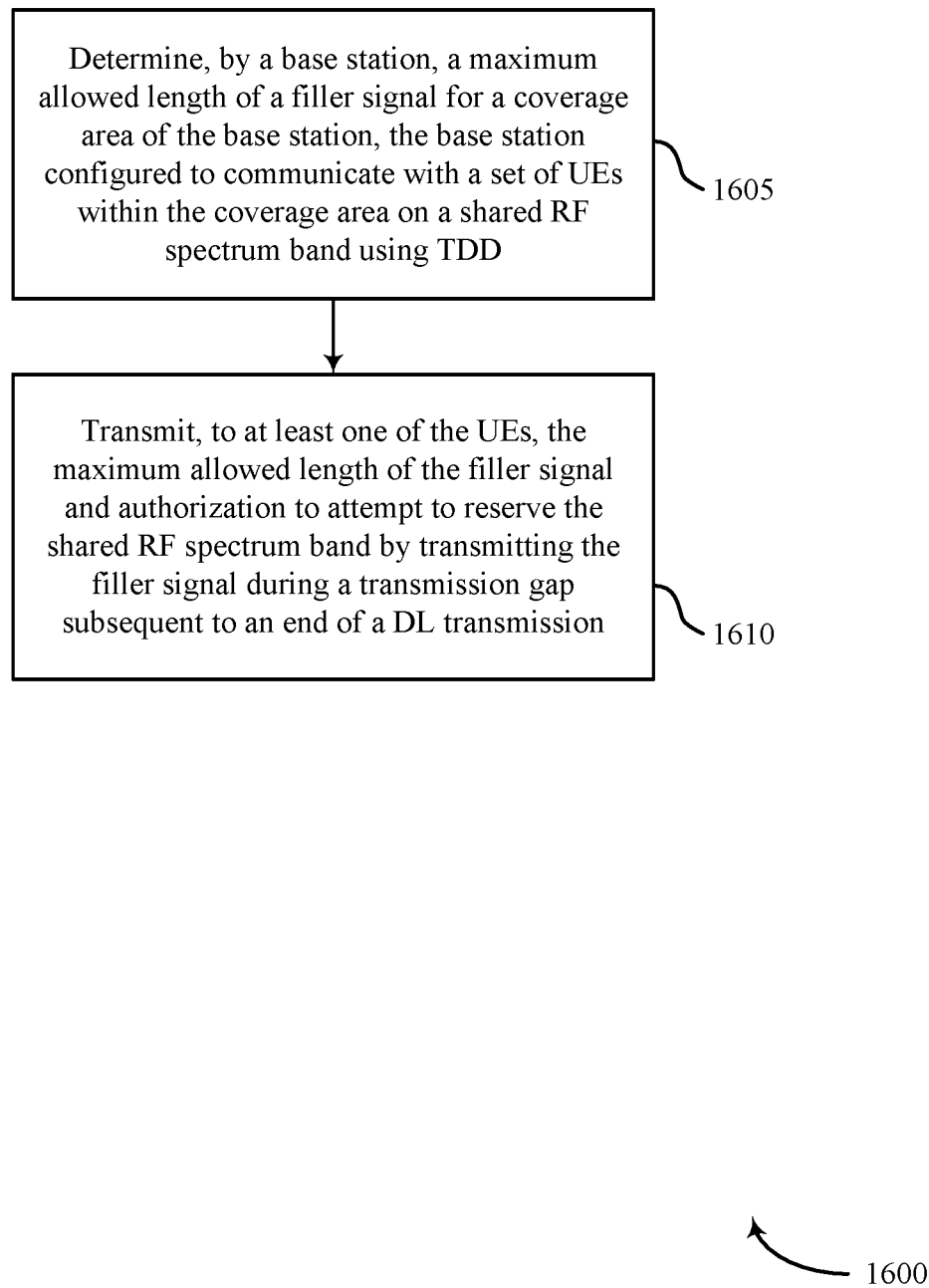

FIG. 16 shows a flowchart illustrating a method 1600 for timing advance design for eCC in accordance with various aspects of the present disclosure. The operations of method 1600 may be implemented by a device such as a base station 105 or its components as described with reference to FIGS. 1 and 2. For example, the operations of method 1600 may be performed by the base station timing advance manager as described herein. In some examples, the base station 105 may execute a set of codes to control the functional elements of the device to perform the functions described below. Additionally or alternatively, the base station 105 may perform aspects the functions described below using special-purpose hardware.

At block 1605, the base station 105 may determine a maximum allowed length of a filler signal for a coverage area of the base station. The base station may be configured to communicate with a set of UEs within the coverage area on a shared RF spectrum band using TDD as described above with reference to FIGS. 2 through 4. In certain examples, the operations of block 1605 may be performed by the filler length component as described with reference to FIGS. 10 and 11.

At block 1610, the base station 105 may transmit, to at least one of the UEs, the maximum allowed length of the filler signal and authorization to attempt to reserve the shared RF spectrum band by transmitting the filler signal during a transmission gap subsequent to an end of a DL transmission as described above with reference to FIGS. 2 through 4. In certain examples, the operations of block 1610 may be performed by the length indication component as described with reference to FIGS. 10 and 11.

Figure 17:
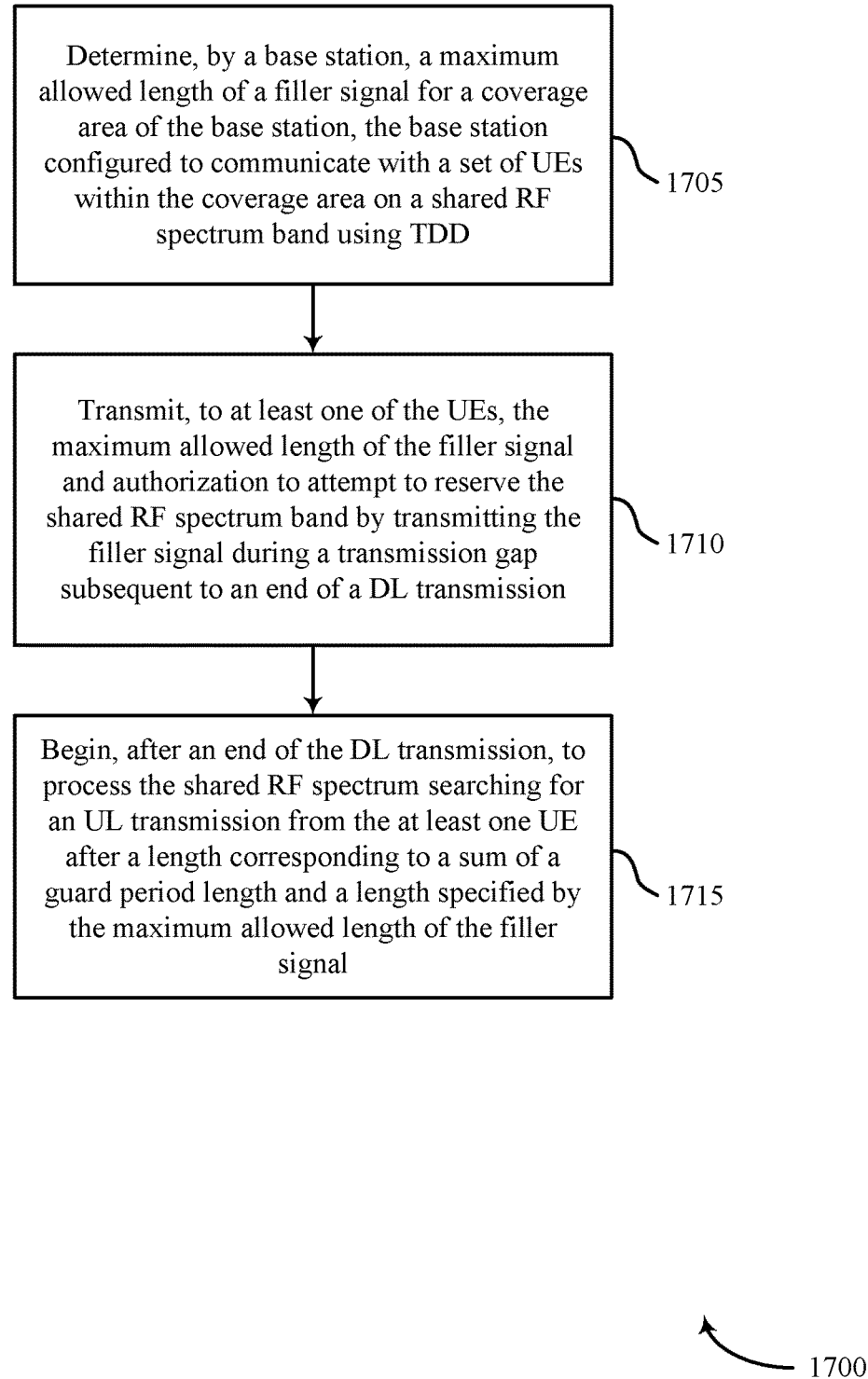

FIG. 17 shows a flowchart illustrating a method 1700 for timing advance design for eCC in accordance with various aspects of the present disclosure. The operations of method 1700 may be implemented by a device such as a base station 105 or its components as described with reference to FIGS. 1 and 2. For example, the operations of method 1700 may be performed by the base station timing advance manager as described herein. In some examples, the base station 105 may execute a set of codes to control the functional elements of the device to perform the functions described below. Additionally or alternatively, the base station 105 may perform aspects the functions described below using special-purpose hardware.

At block 1705, the base station 105 may determine a maximum allowed length of a filler signal for a coverage area of the base station. The base station may be configured to communicate with a set of UEs within the coverage area on a shared RF spectrum band using TDD as described above with reference to FIGS. 2 through 4. In certain examples, the operations of block 1705 may be performed by the filler length component as described with reference to FIGS. 10 and 11.

At block 1710, the base station 105 may transmit, to at least one of the UEs, the maximum allowed length of the filler signal and authorization to attempt to reserve the shared RF spectrum band by transmitting the filler signal during a transmission gap subsequent to an end of a DL transmission as described above with reference to FIGS. 2 through 4. In certain examples, the operations of block 1710 may be performed by the length indication component as described with reference to FIGS. 10 and 11.

At block 1715, the base station 105 may begin, after an end of the DL transmission, to process the shared RF spectrum searching for an UL transmission from the at least one UE after a length corresponding to a sum of a guard period length and a length specified by the maximum allowed length of the filler signal as described above with reference to FIGS. 2 through 4. In certain examples, the operations of block 1715 may be performed by the searching process component as described with reference to FIGS. 10 and 11.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for timing advance design for eCC.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical (physical) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and wireless communications system 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using FDD (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide for timing advance design for eCC. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication comprising:
identifying a length of a filler signal based at least in part on a maximum allowed length of the filler signal configured by a base station;
transmitting the filler signal of the identified length to reserve access to a shared radio frequency (RF) spectrum band, the filler signal transmitted during a transmission gap that occurs between a downlink (DL) transmission and an uplink (UL) transmission in time division duplex (TDD); and
transmitting the UL transmission on the reserved shared RF spectrum band subsequent to the transmission of the filler signal.

2. The method of claim 1, wherein the maximum allowed length of the filler signal corresponds to a length of a maximum round trip signal delay between the base station and an edge of a coverage area of the base station.

3. The method of claim 1, further comprising:
deriving the maximum allowed length of the filler signal from a parameter configured by the base station.

4. The method of claim 1, wherein the identified length of the filler signal is based at least in part on a timing advance value, the timing advance value based at least in part on a propagation delay between a user equipment (UE) and the base station.

5. The method of claim 4, wherein the identified length of the filler signal is based at least in part on a difference between the maximum allowed length of the filler signal and the timing advance value.

6. The method of claim 4, wherein a length of the transmission gap is a based at least in part on a length of a guard period, the timing advance value, and the maximum allowed length of the filler signal.

7. The method of claim 6, wherein the length of the transmission gap varies over time due to changes to the identified length of the filler signal based at least in part on updates to the timing advance value.

8. The method of claim 7, wherein the filler signal is composed of a fixed length portion and a variable length portion.

9. The method of claim 8, wherein the fixed length portion has a minimum specified length for the filler signal and the variable length portion has a length determined based at least in part on an update to the timing advance value.

10. The method of claim 7, wherein the maximum allowed length of the filler signal and the guard period length are constants.

11. The method of claim 6, further comprising:
identifying an end of the DL transmission and a beginning of the guard period length.

12. The method of claim 11, further comprising:
determining that the guard period length has expired prior to transmitting the filler signal.

13. The method of claim 4, further comprising:
identifying an updated timing advance value;
identifying an updated length of the filler signal based at least in part on the maximum allowed length of the filler signal and the updated timing advance value;
transmitting a subsequent filler signal of the updated length during a subsequent transmission gap occurring between a subsequent DL transmission and a subsequent UL transmission; and
transmitting the subsequent UL transmission subsequent to the transmission of the subsequent filler signal.

14. A method of wireless communication comprising:
determining, by a base station, a maximum allowed length of a filler signal for a coverage area of the base station, the base station configured to communicate with a plurality of user equipment (UEs) within the coverage area on a shared radio frequency (RF) spectrum band using time division duplex (TDD); and
transmitting, to at least one of the plurality of UEs, the maximum allowed length of the filler signal and authorization to attempt to reserve the shared RF spectrum band by transmitting the filler signal during a transmission gap subsequent to an end of a downlink (DL) transmission.

15. The method of claim 14, wherein the maximum allowed length of the filler signal corresponds to a length of a maximum round trip signal delay between an edge of the coverage area and the base station.

16. The method of claim 14, wherein the transmitting of the maximum allowed length of the filler signal occurs prior to the DL transmission via broadcast signaling or higher layer signaling.

17. The method of claim 14, wherein the transmitting of the maximum allowed length of the filler signal is part of the DL transmission.

18. The method of claim 14, further comprising:
identifying a timing advance value for the at least one of the plurality of UEs based at least in part on propagation delay between the base station and the at least one of the plurality of UEs.

19. The method of claim 18, further comprising:
identifying a length of the filler signal for the at least one UE based at least in part on the maximum allowed length of the filler signal and the timing advance value.

20. The method of claim 19, wherein the authorization authorizes the at least one UE to attempt to reserve the shared RF spectrum band by transmitting the filler signal of the identified length.

21. The method of claim 20, wherein the authorization identifies at least one of a length of the transmission gap, the identified length of the filler signal, a length of a guard period, or a combination thereof.

22. The method of claim 14, wherein the transmission gap is based at least in part on a guard period length and the maximum allowed length of the filler signal.

23. The method of claim 14, further comprising:
beginning, after an end of the DL transmission, to process the shared RF spectrum searching for an UL transmission from the at least one UE after a length corresponding to a sum of a guard period length and a length specified by the maximum allowed length of the filler signal.

24. An apparatus for wireless communication, comprising:
a processor;
memory in electronic communication with the processor; and
instructions stored in the memory and operable, when executed by the processor, to cause the apparatus to:
identify a length of a filler signal based at least in part on a maximum allowed length of the filler signal configured by a base station;
transmit the filler signal of the identified length to reserve access to a shared radio frequency (RF) spectrum band, the filler signal transmitted during a transmission gap that occurs between a downlink (DL) transmission and an uplink (UL) transmission in time division duplex (TDD); and
transmit the UL transmission on the reserved shared RF spectrum band subsequent to the transmission of the filler signal.

25. The apparatus of claim 24, wherein the maximum allowed length of the filler signal corresponds to a length of a maximum round trip signal delay between the base station and an edge of a coverage area of the base station.

26. The apparatus of claim 24, wherein the instructions are operable to cause the processor to:
derive the maximum allowed length of the filler signal from a parameter configured by the base station.

27. The apparatus of claim 24, wherein the identified length of the filler signal is based at least in part on a timing advance value, the timing advance value based at least in part on a propagation delay between a user equipment (UE) and the base station.

28. An apparatus for wireless communication, comprising:
a processor;
memory in electronic communication with the processor; and
instructions stored in the memory and operable, when executed by the processor, to cause the apparatus to:
determine, by a base station, a maximum allowed length of a filler signal for a coverage area of the base station, the base station configured to communicate with a plurality of UEs within the coverage area on a shared RF spectrum band using TDD; and
transmit, to at least one of the UEs, the maximum allowed length of the filler signal and authorization to attempt to reserve the shared RF spectrum band by transmitting the filler signal during a transmission gap subsequent to an end of a DL transmission.

29. The apparatus of claim 28, wherein the instructions are operable to cause the processor to:
identify a timing advance value for the at least one UE based at least in part on propagation delay between the base station and the at least one UE.

30. The apparatus of claim 29, wherein the instructions are operable to cause the processor to:
identify a length of the filler signal for the at least one UE based at least in part on the maximum allowed length of the filler signal and the timing advance value.

* * * * *